(12) United States Patent
Horst et al.

(10) Patent No.: US 12,179,826 B2
(45) Date of Patent: Dec. 31, 2024

(54) CHILD SEAT FRAME AND COMPACT COLLAPSIBLE STROLLER

(71) Applicant: Wonderland Switzerland AG, Steinhausen (CH)

(72) Inventors: Andrew J. Horst, West Lawn, PA (US); Daniel A. Sack, Pottstown, PA (US)

(73) Assignee: Wonderland Switzerland AG, Steinhausen (CH)

( * ) Notice: Subject to any disclaimer, the term of this patent is extended or adjusted under 35 U.S.C. 154(b) by 321 days.

(21) Appl. No.: 17/756,575

(22) PCT Filed: Nov. 27, 2020

(86) PCT No.: PCT/IB2020/061218
§ 371 (c)(1),
(2) Date: May 27, 2022

(87) PCT Pub. No.: WO2021/105945
PCT Pub. Date: Jun. 3, 2021

(65) Prior Publication Data
US 2023/0001977 A1 Jan. 5, 2023

Related U.S. Application Data

(60) Provisional application No. 62/941,303, filed on Nov. 27, 2019.

(51) Int. Cl.
*B62B 7/08* (2006.01)
*B62B 7/06* (2006.01)
*B62B 7/14* (2006.01)

(52) U.S. Cl.
CPC .............. *B62B 7/083* (2013.01); *B62B 7/064* (2013.01); *B62B 7/14* (2013.01); *B62B 7/142* (2013.01); *B62B 7/147* (2013.01)

(58) Field of Classification Search
CPC ........... B62B 7/14; B62B 7/142; B62B 7/147; B62B 7/064; B62B 7/08; B62B 7/083
See application file for complete search history.

(56) References Cited

U.S. PATENT DOCUMENTS

| 3,459,435 A | 8/1969 | Garner |
|---|---|---|
| 3,556,546 A | 1/1971 | Garner |

(Continued)

FOREIGN PATENT DOCUMENTS

| CN | 201769848 U | 3/2011 |
|---|---|---|
| CN | 103269936 A | 8/2013 |

(Continued)

OTHER PUBLICATIONS

EP Office Action dated Jun. 19, 2023 from the related EP Patent Application No. 20 841 758.4, 4 sheets.

(Continued)

*Primary Examiner* — Emma K Frick
(74) *Attorney, Agent, or Firm* — Fay Kaplun & Marcin, LLP

(57) ABSTRACT

Disclosed are a child seat frame and a compact collapsible stroller. The child seat frame includes a seat mounting part, a lower frame body, and an upper frame body. The upper frame body is provided with an upper frame body lock which can be actuated to lock and disengage from a second latch part, and the upper frame body is pivotable relative to a lower seat frame hub when the upper frame body lock is disengaged from the lower seat frame hub; and when the lower frame body pivots relative to the seat mounting part, the upper frame body lock locks over the second latch part. The child seat frame can be folded in a main suitable for the folding boundary dimensions of a main stroller frame, thereby maintaining the folding dimensions of a stroller unit to a minimum.

16 Claims, 22 Drawing Sheets

(56) References Cited

U.S. PATENT DOCUMENTS

| | | | |
|---|---|---|---|
| 3,873,116 A | 3/1975 | Perego | |
| 6,523,853 B1 | 2/2003 | Cheng | |
| 7,255,206 B1 | 8/2007 | Hackbarth et al. | |
| 7,267,359 B1 | 9/2007 | Yang et al. | |
| 7,338,127 B2 | 3/2008 | Church | |
| 7,377,537 B2* | 5/2008 | Li | B62B 7/142 280/47.38 |
| 7,413,213 B2 | 8/2008 | Pike et al. | |
| 8,087,689 B2 | 1/2012 | Fritz et al. | |
| 8,322,744 B2* | 12/2012 | Ahnert | B62B 7/142 280/47.4 |
| 8,474,854 B2* | 7/2013 | Dean | B62B 7/142 280/47.38 |
| 8,596,669 B2 | 12/2013 | Liao | |
| 8,657,326 B2 | 2/2014 | Shaanan et al. | |
| 8,672,341 B2 | 3/2014 | Offord | |
| 8,714,581 B2* | 5/2014 | Fritz | B62B 9/245 280/643 |
| 8,764,048 B1 | 7/2014 | Ahnert et al. | |
| 9,010,773 B2 | 4/2015 | Horst et al. | |
| 9,050,993 B2* | 6/2015 | Pollack | B62B 7/08 |
| 9,085,312 B2* | 7/2015 | Liu | B62B 7/062 |
| 9,108,659 B2 | 8/2015 | Sparling | |
| 9,193,373 B2* | 11/2015 | Fjelland | B62B 7/10 |
| 9,221,487 B2 | 12/2015 | Doucette et al. | |
| 9,260,128 B2 | 2/2016 | Liu | |
| 9,399,477 B2* | 7/2016 | Iftinca | B62B 9/104 |
| 9,517,786 B2* | 12/2016 | Chang | B62B 7/062 |
| 9,517,787 B2 | 12/2016 | Zehfuss et al. | |
| 9,545,940 B2 | 1/2017 | Taylor et al. | |
| 9,610,966 B2* | 4/2017 | Zhong | B62B 7/142 |
| 9,796,405 B2 | 10/2017 | Li et al. | |
| 9,962,011 B1* | 5/2018 | Eyman | B62B 9/12 |
| 10,000,226 B2 | 6/2018 | Yi | |
| 10,144,442 B2 | 12/2018 | Ransil | |
| 10,239,550 B2* | 3/2019 | Ruggiero | B62B 7/105 |
| 10,293,843 B2 | 5/2019 | Naslain | |
| 10,442,453 B2 | 10/2019 | Haut et al. | |
| 10,479,390 B2 | 11/2019 | Zhong | |
| 10,766,517 B2 | 9/2020 | Cheng et al. | |
| 10,787,188 B2 | 9/2020 | Popp | |
| 10,858,030 B2 | 12/2020 | Horst | |
| 10,882,546 B2 | 1/2021 | Wang et al. | |
| 10,913,481 B2* | 2/2021 | Kim | B62B 7/06 |
| 11,021,183 B2 | 6/2021 | Ma et al. | |
| 11,203,371 B2 | 12/2021 | Zhong | |
| 11,208,136 B2 | 12/2021 | Taylor et al. | |
| 11,225,279 B2 | 1/2022 | Horst et al. | |
| 11,247,710 B2* | 2/2022 | Yi | B62B 7/08 |
| 11,358,623 B2 | 6/2022 | Zhong | |
| 2006/0082104 A1 | 4/2006 | Wun | |
| 2007/0164538 A1 | 7/2007 | Yeh | |
| 2008/0079240 A1 | 4/2008 | Yeh | |
| 2010/0025968 A1 | 2/2010 | Fritz et al. | |
| 2010/0308550 A1 | 12/2010 | Li et al. | |
| 2013/0113185 A1 | 5/2013 | Zehfuss | |
| 2013/0113188 A1 | 5/2013 | Liao | |
| 2014/0191483 A1 | 7/2014 | Rolicki et al. | |
| 2014/0334867 A1 | 11/2014 | Su et al. | |
| 2015/0048599 A1 | 2/2015 | Liu | |
| 2015/0151774 A1 | 6/2015 | Liu | |
| 2015/0183450 A1 | 7/2015 | Chen | |
| 2015/0197270 A1 | 7/2015 | Sundberg et al. | |
| 2015/0291200 A1 | 10/2015 | Taylor et al. | |
| 2016/0101802 A1 | 4/2016 | Zhong | |
| 2017/0144687 A1 | 5/2017 | Li et al. | |
| 2017/0217471 A1 | 8/2017 | Haut et al. | |
| 2017/0297599 A1 | 10/2017 | Zhong | |
| 2017/0313337 A1 | 11/2017 | Horst | |
| 2018/0162437 A1 | 6/2018 | Mostert | |
| 2019/0217879 A1 | 7/2019 | Gibson | |
| 2019/0351929 A1 | 11/2019 | Williams et al. | |
| 2020/0172142 A1 | 6/2020 | Young et al. | |
| 2020/0239058 A1 | 7/2020 | Zhang | |
| 2020/0353967 A1 | 11/2020 | Horst et al. | |
| 2021/0094601 A1 | 4/2021 | Wu | |
| 2021/0114649 A1 | 4/2021 | Yuan | |
| 2021/0129886 A1 | 5/2021 | Zehfuss | |
| 2023/0001976 A1* | 1/2023 | Horst | B62B 7/08 |
| 2023/0078130 A1 | 3/2023 | Longenecker et al. | |
| 2023/0219612 A1* | 7/2023 | Horst | B62B 9/102 280/39 |

FOREIGN PATENT DOCUMENTS

| | | | | |
|---|---|---|---|---|
| CN | 203558113 U | 4/2014 | | |
| CN | 105539557 A | 5/2016 | | |
| CN | 106184331 A | 12/2016 | | |
| CN | 206384007 U | 8/2017 | | |
| CN | 107380241 A | 11/2017 | | |
| CN | 206885123 U | 1/2018 | | |
| CN | 207360393 U | 5/2018 | | |
| CN | 106741091 B | 4/2019 | | |
| CN | 209079968 U | * | 7/2019 | |
| CN | 209535175 U | 10/2019 | | |
| CN | 116101353 A | * | 5/2023 | B62B 7/064 |
| DE | 20 2006 012 430 U1 | 10/2006 | | |
| DE | 10 2016 120455 A1 | 5/2017 | | |
| DE | 10 2017109236 A1 | 11/2017 | | |
| EP | 1 735 200 A2 | 12/2006 | | |
| EP | 1735 200 B1 | 1/2011 | | |
| EP | 2 611 670 A1 | 7/2013 | | |
| EP | 3 484 758 A1 | 5/2019 | | |
| EP | 2 611 670 B1 | 4/2020 | | |
| GB | 2496225 A | 5/2013 | | |
| JP | 2015-224023 | 12/2015 | | |
| JP | 2018-008697 | 1/2018 | | |
| TW | 201028317 A | 8/2010 | | |
| TW | 201429773 A | 8/2014 | | |
| WO | 2005/100125 | 10/2005 | | |
| WO | 2012/027795 A1 | 3/2012 | | |
| WO | 2018/009971 A1 | 1/2018 | | |

OTHER PUBLICATIONS

EP Office Action dated Jul. 27, 2023 from the related EP Patent Application No. 20 839 141.7, 6 sheets.

Notice of Allowance dated Sep. 10, 2021 from the related U.S. Appl. No. 16/869,604, 17 sheets.

Notice of Allowance dated Nov. 8, 2023 from the related U.S. Appl. No. 17/806,202, 29 sheets.

Non-Final Office Action dated Jan. 19, 2024 from the related U.S. Appl. No. 17/756,454, 16 sheets.

CA Office Action dated Oct. 16, 2023 from the related CA Patent Appln. Serial No. 3,154,263, 7 sheets.

JP Office Action dated Jun. 12, 2023 along with the English translation from the related JP Patent Appln. Serial No. 2022-529890, 14 sheets.

CN 1st Office Action dated Feb. 25, 2022 along with the English translation from the related CN Patent Appln. Serial No. 202010387208.9, 21 sheets.

CN 2nd Office Action dated Aug. 16, 2022 along with the English translation from the related CN Patent Appln. Serial No. 202010387208.9, 18 sheets.

CN 1st Office Action dated Apr. 6, 2022 along with the English translation from the related CN Patent Appln. Serial No. 202010383657.6, 19 sheets.

Final Office Action dated Aug. 16, 2024 from the U.S. Appl. No. 17/756,454, 20 sheets.

* cited by examiner

CHILD SEAT FRAME AND COMPACT COLLAPSIBLE STROLLER

PRIORITY CLAIM

The present application is a National Phase application of PCT Application Serial No. PCT/IB2020/061218 filed Nov. 27, 2020; which claims priority to U.S. Provisional Application Ser. No. 62/941,303 filed Nov. 27, 2019. The disclosure of the above patent(s)/application(s) is incorporated herein by reference.

FIELD OF THE INVENTION

The present disclosure generally relates to strollers used to transport children while the caregiver is walking outside of the home. More particularly, the present disclosure relates to a stroller capable of folding to a compact size while still allowing for multiple seating modes for the child. The present invention also relates to a child seat frame of a stroller.

BACKGROUND OF THE INVENTION

There are several strollers in the market that allow the child seat to be coupled to the main stroller frame in multiple configurations, as well as strollers that are able to fold to a compact and easily transported size. Currently strollers that offer multiple seating modes for the child do not fold to a compact size that is easy to transport. Furthermore, stroller that are able to fold to a compact size, often do not have full features on the child seat or the main stroller frame, in addition to small wheels that do not allow the stroller to handle uneven terrain.

SUMMARY OF THE INVENTION

The present disclosure relates to a compact collapsible stroller which can reduce or eliminate at least one of the above-mentioned disadvantages.

This disclosure features a main stroller frame and a child seat that can be attached to the main stroller frame in multiple configurations.

It is a feature of this disclosure that the stroller is folded in 2 steps because the child seat folds separately from the main stroller frame.

It is a feature of this disclosure that as part of the seat fold, the seat frame is released to pivot about the seat mount so that both the upper and lower seat frames hang relatively vertical in relation to the seat mount.

The present disclosure provides a child seat frame which includes: a seat mount for fixing to a main stroller frame, the seat mount having a first latch portion; a lower frame having a lower seat frame hub and pivotally coupled to the seat mount, wherein the lower frame has a second latch portion and a lower frame locker, and the lower frame locker can be actuated to engage with and disengage from the first latch portion, and the lower frame pivots relative to the seat mount when the lower frame locker disengages from the first latch portion; an upper frame having an upper seat frame hub and pivotally coupled to the seat mount and the lower frame, and the upper frame having an upper frame locker, wherein the upper frame locker can be actuated to engage with and disengages from the second latch portion, and the upper frame pivots relative to the lower seat frame hub when the upper frame locker disengages from the lower seat frame hub; wherein, when the lower frame pivots relative to the seat mount, the upper frame locker is locked onto the second latch portion.

In another aspect of the present disclosure, there is provided a compact collapsible stroller, which includes a main stroller frame and a child seat frame that can be attached to the main stroller frame as described above.

It is an advantage of this disclosure that the child seat frame pivot is located to allow the seat frame to be folded within the main stroller frame folding boundary.

It is an advantage of this disclosure that the child tray is released from a locked position and able to pivot relative to the child seat frame during the motion of folding the child seat frame.

It is an advantage of this disclosure that the free pivoting vertical orientation allows the seat to find an optimal storage location within the main stroller frame folding boundary.

BRIEF DESCRIPTION OF THE DRAWINGS

Various objects, features and advantages of the present disclosure will become more apparent from the detailed descriptions of exemplary embodiments of the present disclosure with reference with the accompanying drawings. The drawings are merely schematic illustrations of the present disclosure and are not necessarily drawn to scale. In the drawings, the same reference numerals refer to the same or similar components throughout the present disclosure. Wherein.

Figure 1:
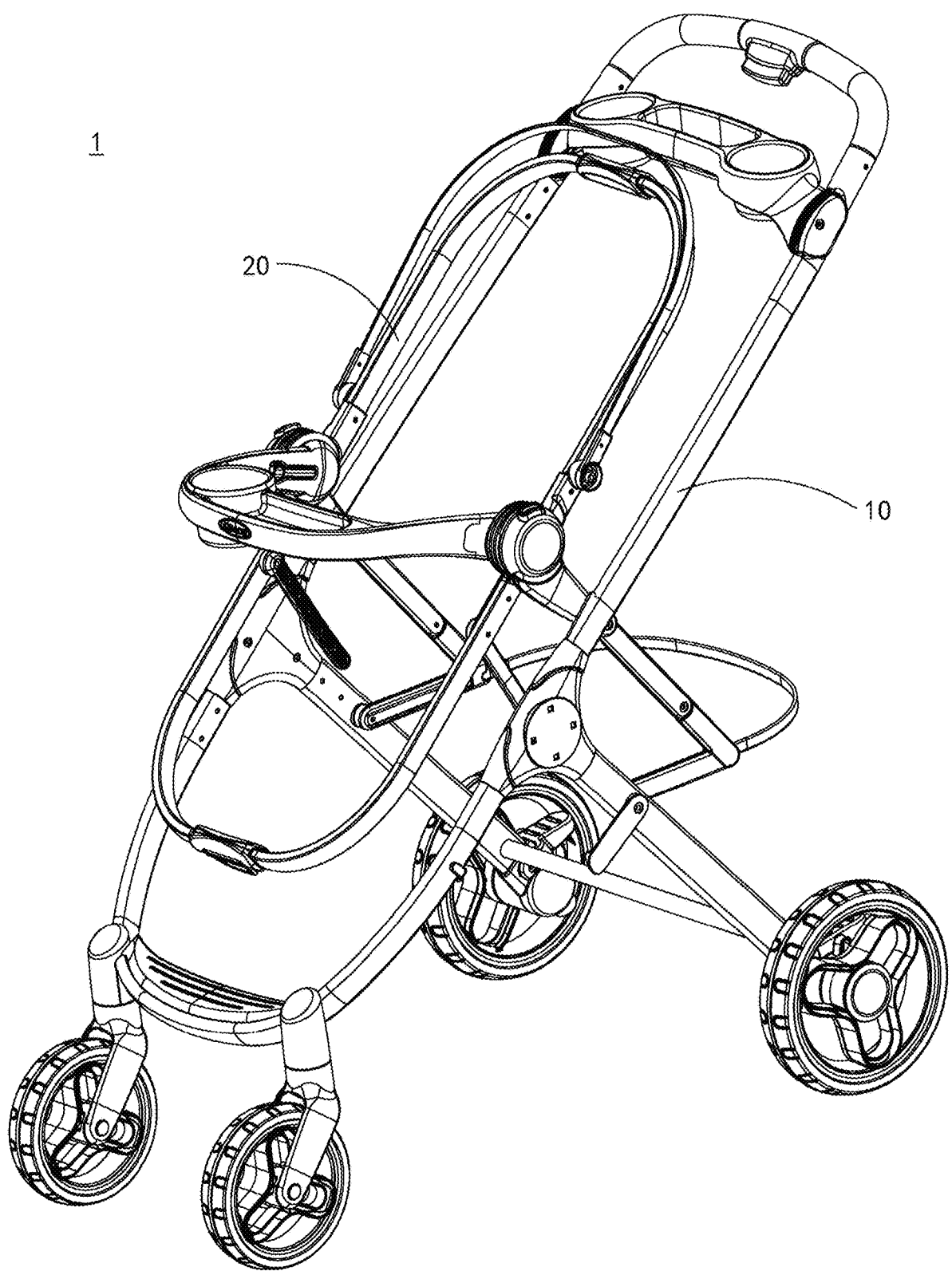
FIG. 1 is a perspective view of the compact collapsible stroller of the present disclosure.

LIST OF REFERENCE SIGNS compact collapsible stroller 1
main stroller frame 10
handle portion 110
handle plate 111
spring biased plunger 112
upper handle portion 113
handle hub 114
circular barrel 1141
lower handle portion 115
pivot point 1151
upper link 116
lower link 117
rear leg portion 120
rear leg plate 121
locking pin 1211
pivot point 122
front leg portion 130
front leg plate 131
central frame hub 140
frame latch 150
extended latching surface 151
link 160
child seat frame 20
upper frame 210
upper seat frame hub 211
ramped surface 2111
spiral control surface 2112
upper frame locker 212
fold handle 213
lower frame 220
lower seat frame hub 221
lower frame locker 222
lower frame locker control post 2221
recline handle 223
second latch portion 224
child tray 230
child tray hub 231
seat mount 240
first latch portion 241
latch pin assembly 250
ramped surface 251

DETAILED DESCRIPTION OF THE INVENTION

In order to further illustrate the principle and structure of the present disclosure, the preferred embodiments of the present disclosure will be described in detail with reference to the accompanying drawings. However, the embodiments are only provided for illustration and explanation and cannot be used to limit the scope of patent protection of the present disclosure.

The terms used in the present disclosure are only for the purpose of describing specific embodiments and are not intended to limit the present disclosure. The singular forms of "a", "said" and "the" used in the present disclosure and the appended claims are also intended to include plural forms, unless the context clearly indicates other meanings. It should also be understood that the term "and/or" used herein refers to and includes any or all possible combinations of one or more associated listed items.

The compact collapsible stroller (hereinafter referred to as "stroller") 1 of the present disclosure includes a collapsible main stroller frame 10 that can accommodate child seat frames 20 of various configurations (as shown in FIG. 1).

Figure 2:
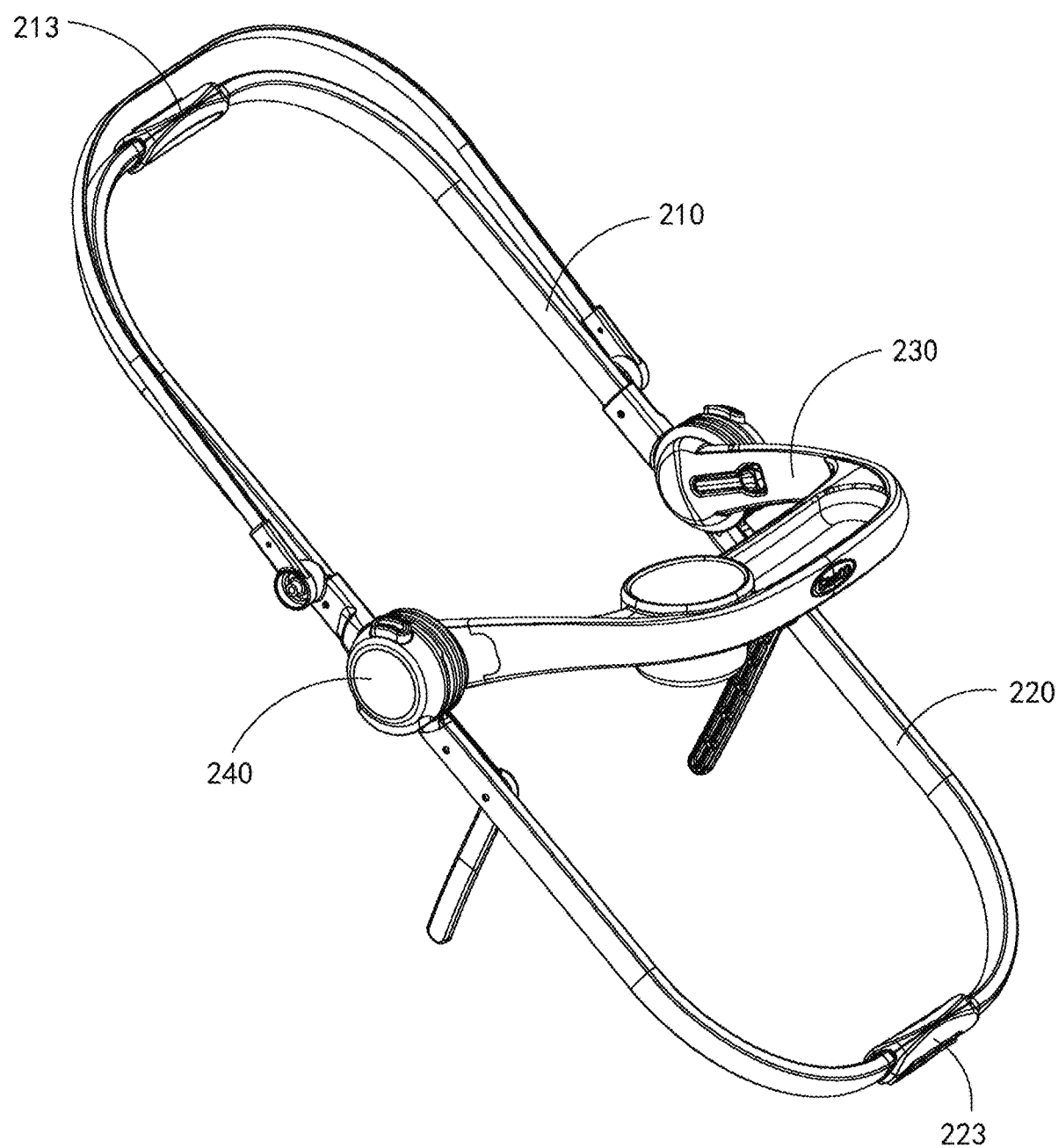
FIG. 2 is a perspective view of the child seat frame of the compact collapsible stroller of the present disclosure.
Figure 3:
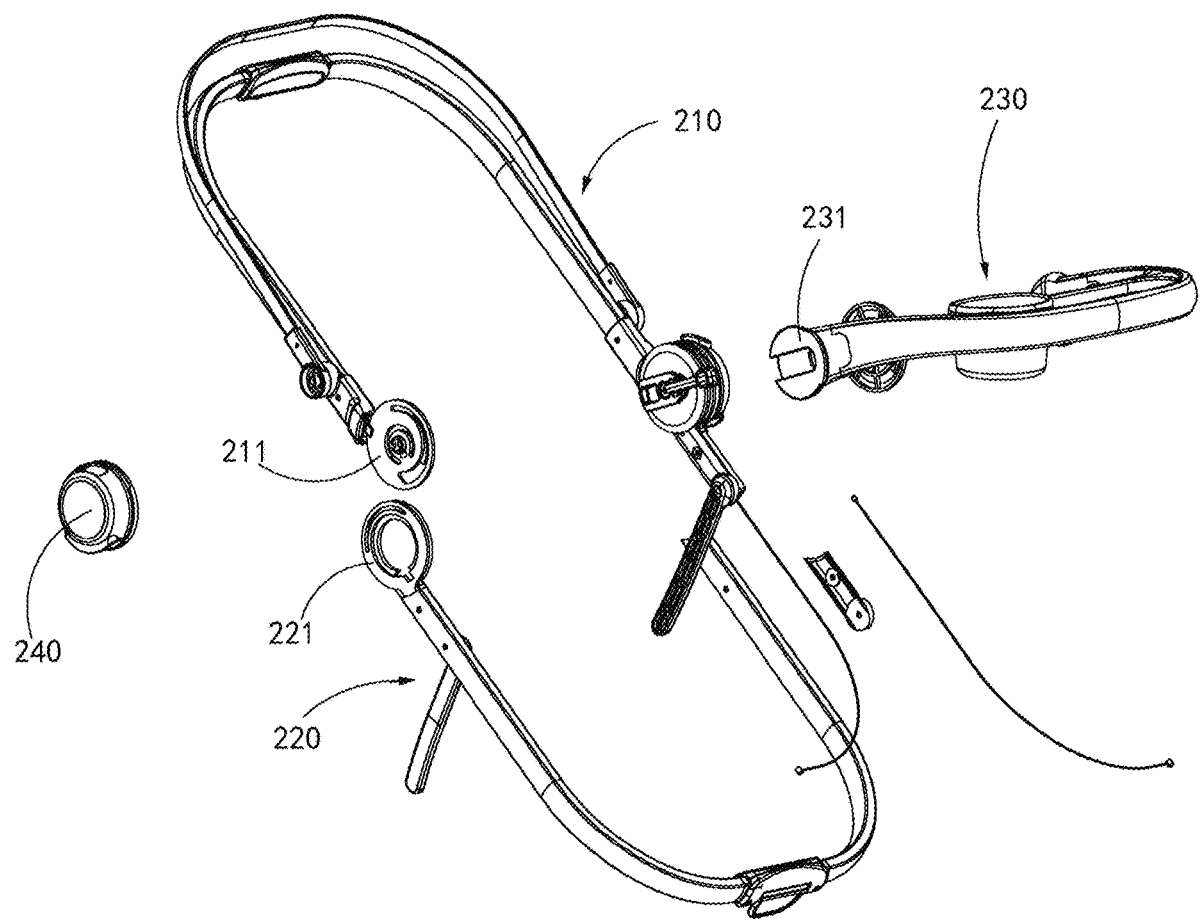
FIG. 3 is a perspective exploded view of the child seat frame of the compact collapsible stroller of the present disclosure.
Figure 3A:
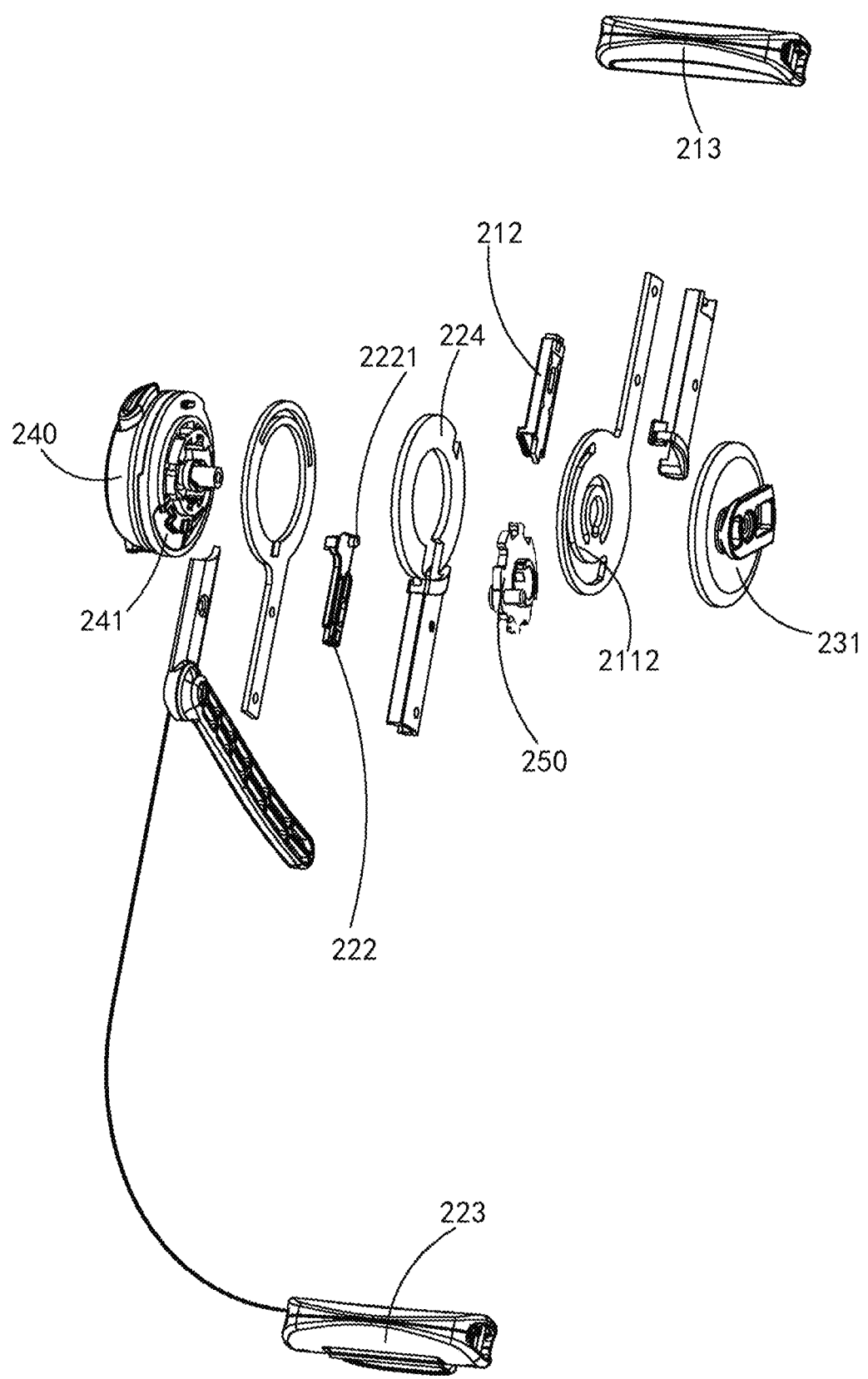
FIG. 3A is a perspective exploded view of some parts of the child seat frame of the compact collapsible stroller of the present disclosure.

One configuration of the child seat frame 20 includes an upper frame 210, a lower frame 220, a child tray 230, and a seat mount 240 (as shown in FIG. 2). The seat mount 240 is configured to fix to the main stroller frame 10. The upper frame 210 and the lower frame 220 are pivotally connected to the seat mount 240 through an upper seat frame hub 211 and a lower seat frame hub 221. Likewise, as shown in FIGS. 3 and 3A, the child tray 230 is pivotally connected to the seat hub (seat mount) 240 through a child tray hub 231. The lower frame 220 has a second latch portion 224 and a lower frame locker 222.

Figure 4:
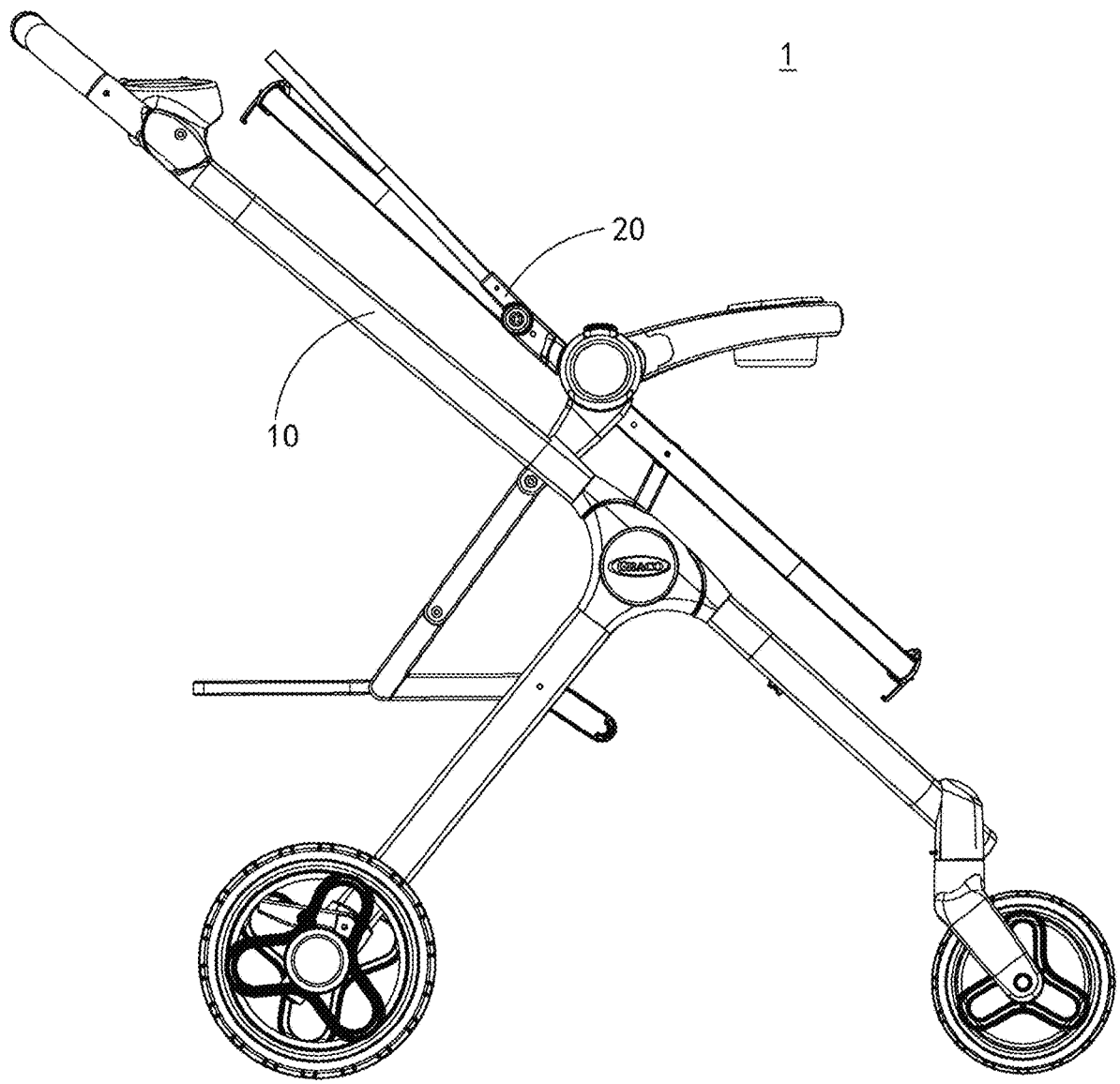
FIG. 4 is a side view of the compact collapsible stroller of the present disclosure, in which the child seat frame is in the seat mode.
Figure 4A:
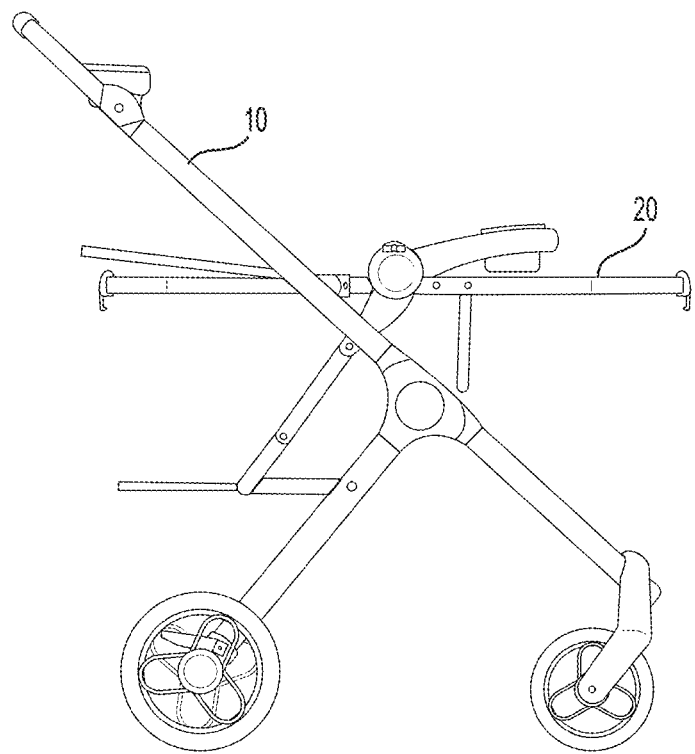
FIG. 4A is a side view of the compact collapsible stroller of the present disclosure, in which the child seat frame is in the cradle mode.

Referring to FIGS. 4 and 4A, the child seat frame 20 has a seat mode and a cradle mode. One configuration for coupling the child seat frame 20 to the main stroller frame 10 is in a forward sitting position, which is the seat mode. In the seat mode, the upper frame 210 extends upward from the seat mount 240, specifically, obliquely extending backward and upward, and the lower frame 220 may extend downward from the seat mount 240, specifically, obliquely extending forward and downward. At this time, the upper frame 210 and the lower frame 220 are formed in a linear shape passing through the seat mount 240. In the cradle mode, the upper frame 210 and the lower frame 220 extend horizontally from the seat mount 240 to both sides thereof. The child seat frame 20 is converted from the position shown in FIG. 4 to a position where the cradle is lying down.

Figure 5:
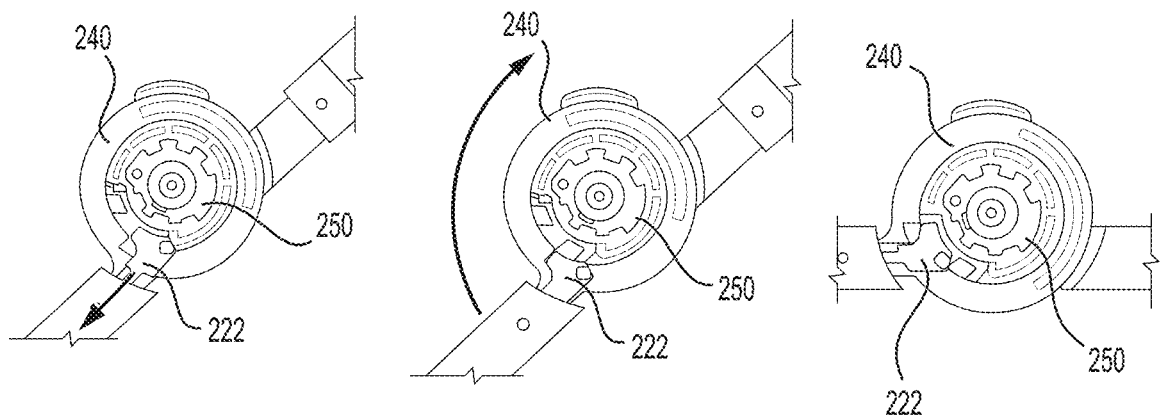
FIG. 5 is a partial view of different modes of the child seat frame of the compact collapsible stroller of the present disclosure.

Referring to FIG. 5, in order to convert the child seat frame 20 from the seat mode to the cradle position (i.e., the cradle mode), the user may manipulate the recline handle 223, which uses a cable to retract the spring-loaded lower frame locker 222 from a position engaging with the seat mount 240. This allows the entire child seat frame 20 to rotate to a horizontal position relative to the seat mount 240, and re-engages the spring-loaded lower frame locker 222 with the seat mount 240 to lock the child seat frame 20 in this position.

Figure 6:
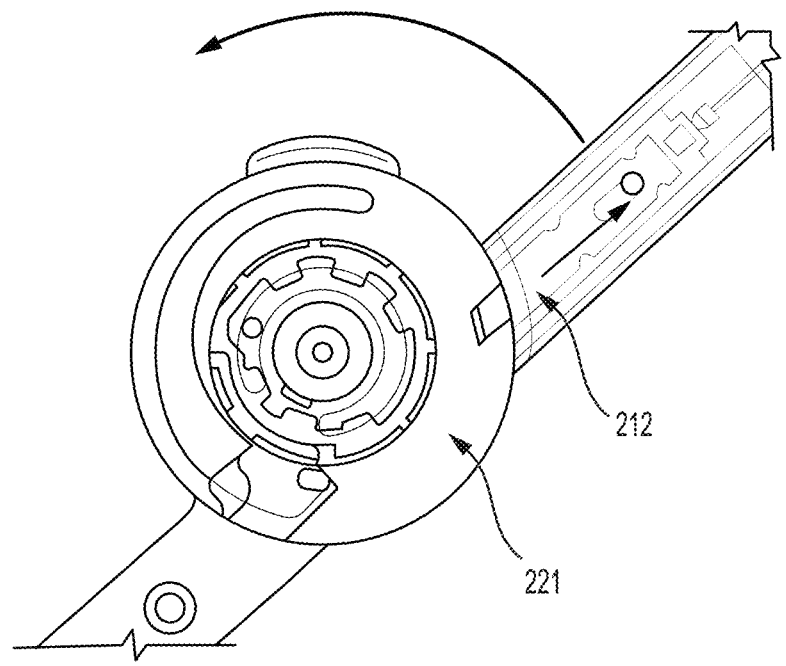
FIG. 6 is a partial view of the child seat frame of the compact collapsible stroller in the seat mode of the present disclosure.
Figure 7:
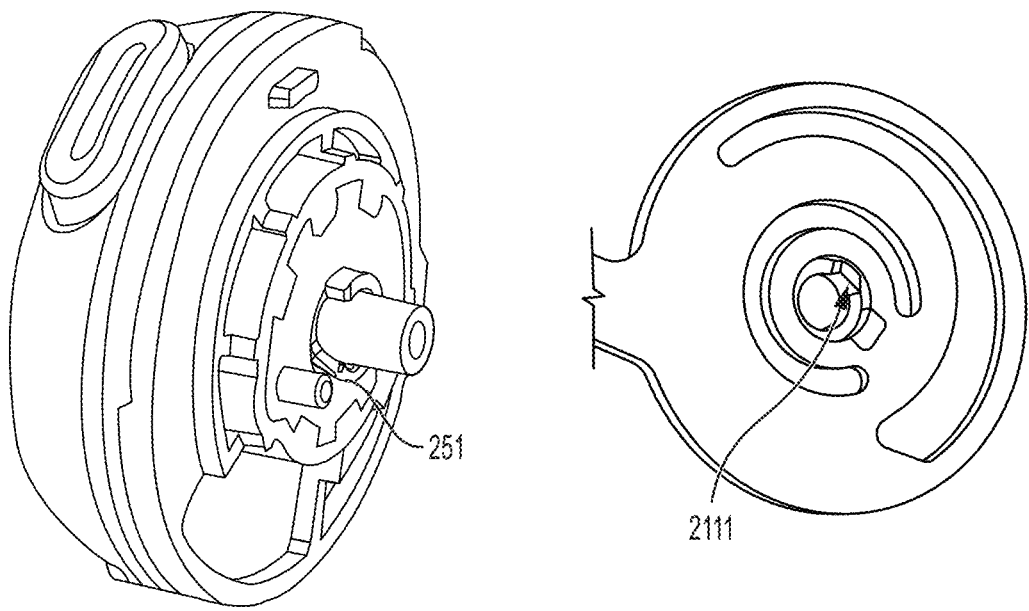
FIG. 7 is a perspective exploded view of some parts of the child seat frame of the compact collapsible stroller of the present disclosure.

Referring to FIG. 6, in addition to the reclining handle 223, the child seat frame 20 also includes a fold handle 213 for folding the child seat frame 20, as a part of the folding of the stroller. The fold handle 213 retracts the spring-biased upper frame locker 212 from its engagement position with the lower seat frame hub 221. The upper frame (i.e., upper seat frame) 210 can now rotate around the seat mount 240 relative to the lower frame (i.e., lower seat frame) 220. Referring to FIG. 7, when the upper frame 220 rotates, a ramped surface 2111 in the upper seat frame hub 211 acts on a ramped surface 251 on the latch pin assembly 250 to press the latch pin assembly 250 into the seat mount 240, and separate the latch pin assembly 250 from the child tray hub 231, thereby releasing the child tray 230 to be able to pivot freely around the seat mount 240. In addition, referring to FIG. 8, a spiral control surface 2112 located in the upper seat frame hub 211 disengages the two lower seat frame hubs 221 from the seat mount 240 because it acts on a lower frame locker control post 2221. This allows the lower frame 220 to rotate around the seat mount 240 to a relatively vertical (upright) position with respect to the seat mount 240. The spiral control surface 2112 is formed to gradually move away from the center of the upper seat frame hub 211 from one side to the other, so that when the upper seat frame hub 211 rotates relative to the seat mount 240, the spiral control surface 2112 may abut against and push the lower frame locker control post 2221 to move away from the seat mount 240. Referring to FIG. 9, this operation causes the upper frame 210, the lower frame 220 and the child tray 230 to fall parallel to one another and relatively vertical (upright) to the seat mount 240.

Figure 8:
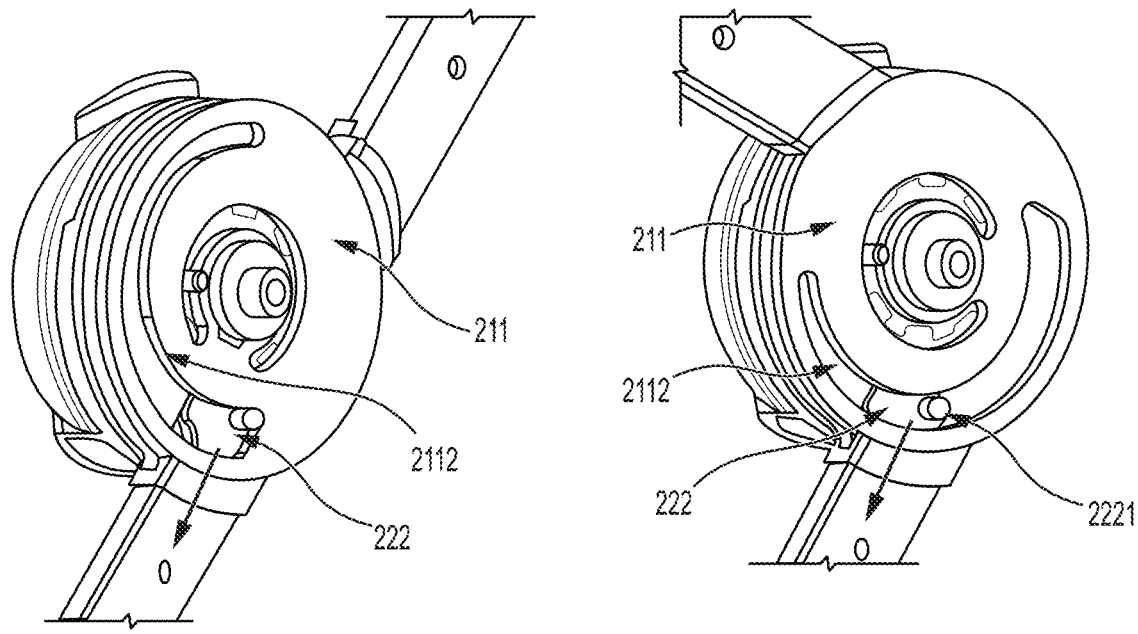
FIG. 8 is a partial view of the child seat frame of the compact collapsible stroller in different states of the present disclosure.
Figure 9:
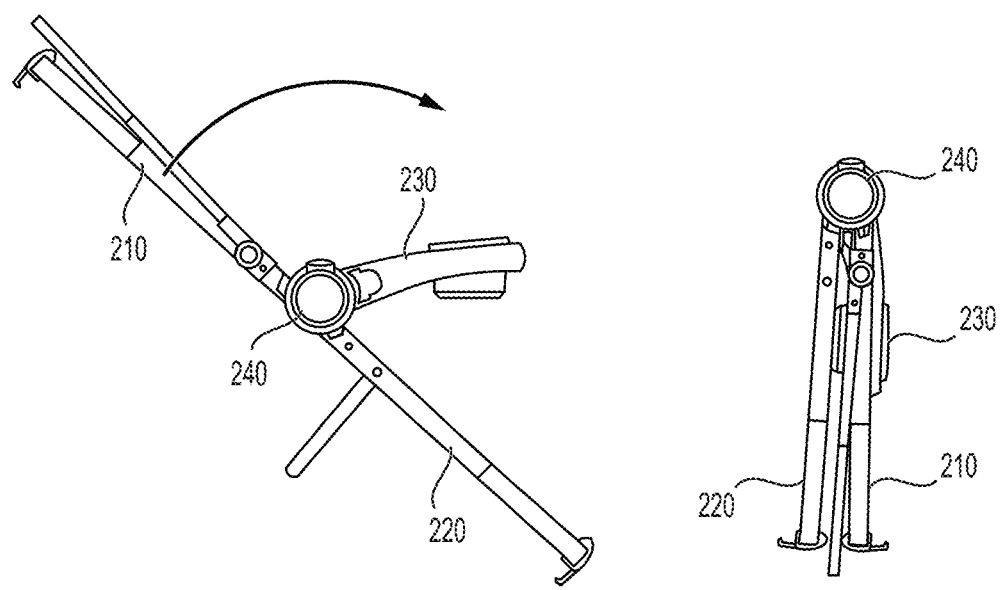
FIG. 9 is a side view of the child seat frame of the compact collapsible stroller in an unfolded and folded state of the present disclosure.

The upper seat frame hub 211 includes a driving slot (as shown in FIG. 8, the slot forming the spiral control surface 2112), and the lower frame locker 222 includes a guide post 2221 movably arranged in the driving slot. The driving slot is generally arc-shaped and has a certain angle range, for example, less than 180°.

The spiral control surface 2112 is formed in the driving slot and is gradually away from the center of the upper seat frame hub from one side to the other side.

The guide post 2221 abuts against the spiral control surface 2112, wherein when the upper seat frame hub 211 rotates, the spiral control surface 2112 can actuate the lower frame locker 222 so that the lower frame 220 engages with and disengages from the seat mount 240. That is, the rotation of the upper seat frame hub 211 may cause the lower frame 220 to engages with and disengages from the seat mount 240. Optionally, a forward rotation (the direction from the left picture to the right picture shown in FIG. 8) of the upper seat frame hub 211 causes an unlocking state between the lower frame 220 and the seat mount 240.

The spiral control surface 2112 is formed to disengage the lower frame 220 from the seat mount 240 after the upper seat frame hub 211 rotates by one angle in the state where the lower frame 220 engages with the seat mount 240.

The driving slot changes the slot width to drive the guide post 2221 arranged in the driving slot to produce displacement.

When the upper seat frame 211 moves away from the lower seat frame 220, the guide post 2221 is located at a position where the slot width of the driving slot is larger (the left figure in FIG. 8). When the upper seat frame 211 gradually approaches the lower seat frame 220, the slot width of the driving slot is gradually reduced. At this time, the moving direction of the guide post 2221 is restricted to drive the guide post 2221 arranged in the driving slot to gradually move away from the center of the upper seat frame hub 211. The seat mount 240 has a first latch portion 241. When the upper seat frame 211 and the lower seat frame 220 move close to each other, the guide post 2221 is located at a position where the slot width of the driving slot is smaller. At this time, the lower frame locker 222 is driven by the guide post 2221 to disengages from the first latch portion 241 so that the lower frame and the upper seat frame 211 pivots relative to the seat mount 240 together. The lower frame locker 222 is actuated to be locked with and disengages from the first latch portion 241. When the lower frame locker 222 disengages from the first latch portion 241, the lower frame 220 pivots with respect to the seat mount 240.

Figure 10:
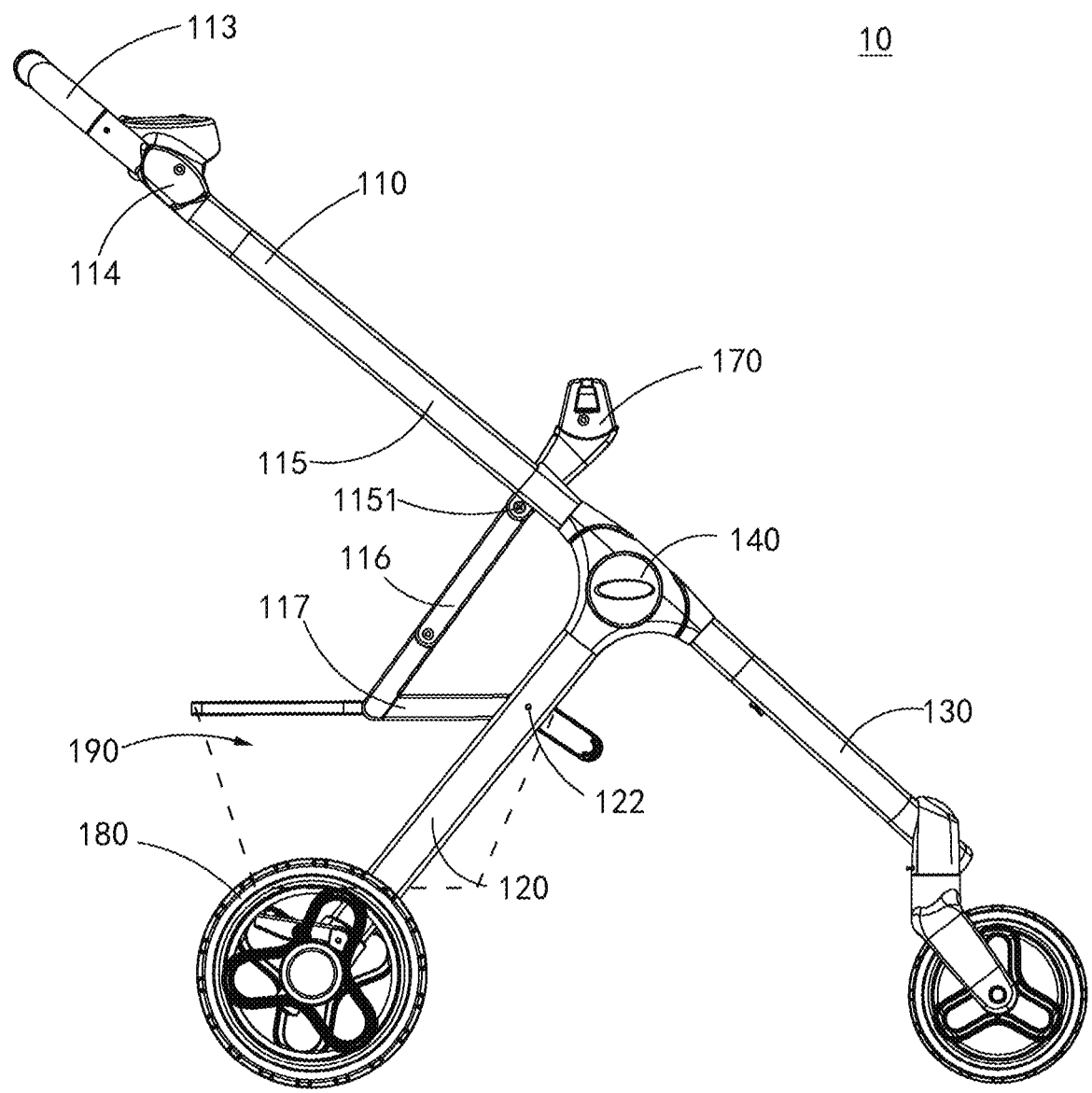
FIG. 10 is a side view of the main stroller frame of the compact collapsible stroller of the present disclosure.

Referring to FIG. 10, the stroller main frame 10 includes a handle portion 110, a rear leg portion 120 and a front leg portion 130. Each part of the stroller main frame 10 is pivotally connected to a central frame hub 140.

Figure 11:
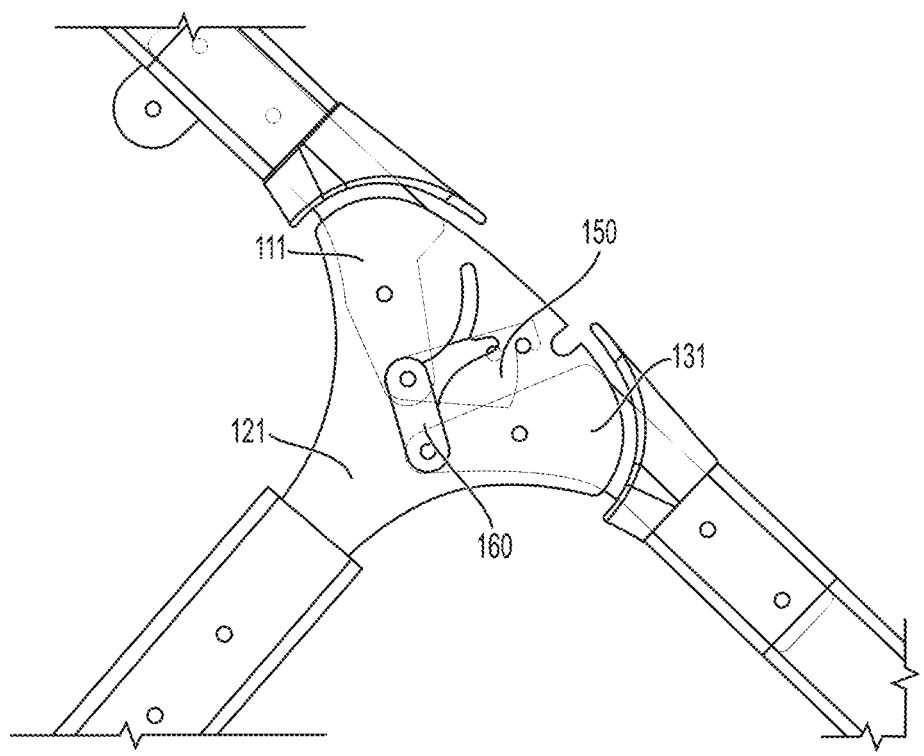
FIG. 11 is a partial view of the main stroller frame of the compact collapsible stroller of the present disclosure, in which one side of the internal structure is exposed.
Figure 11A:
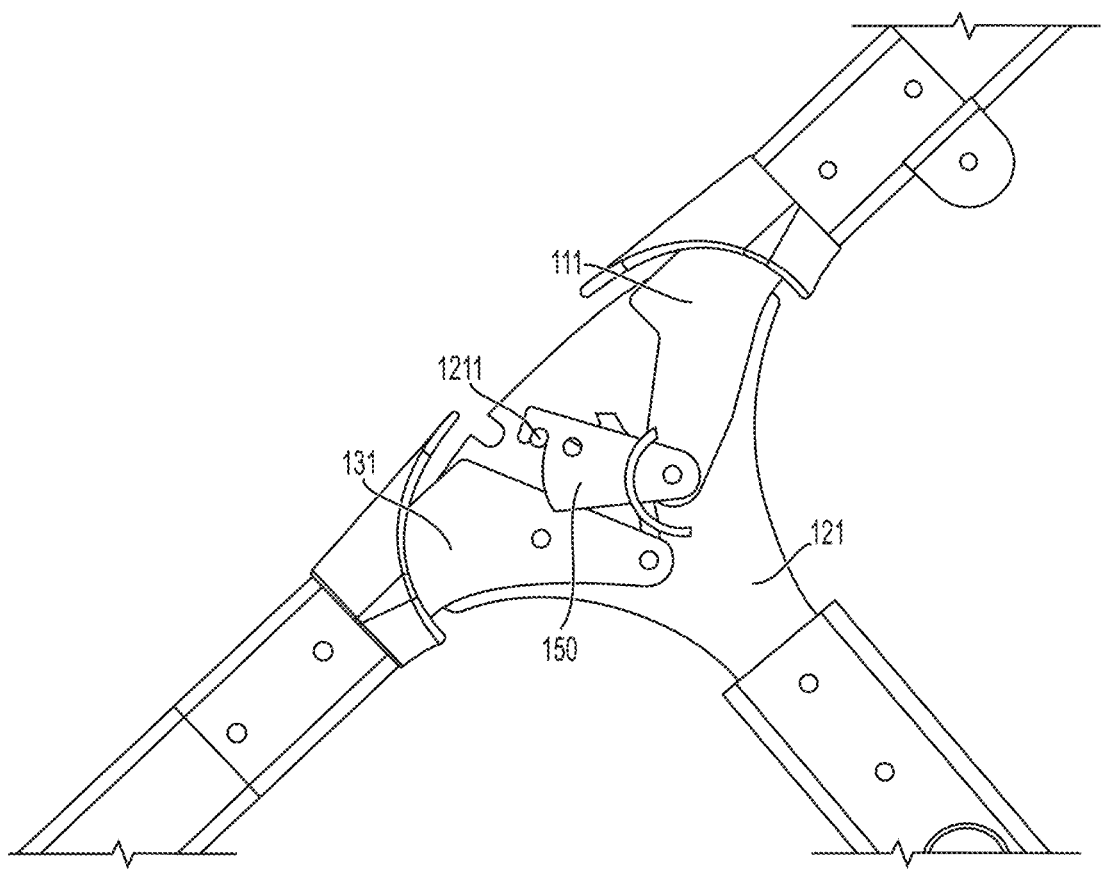
FIG. 11A is a partial view of the main stroller frame of the compact collapsible stroller of the present disclosure, in which the other side of the internal structure is exposed.
Figure 12:
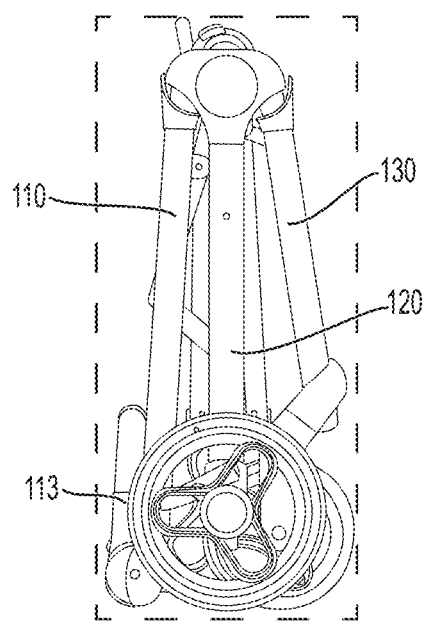
FIG. 12 is a view of the main stroller frame of the compact collapsible stroller in a folded state of the present disclosure.
Figure 13:
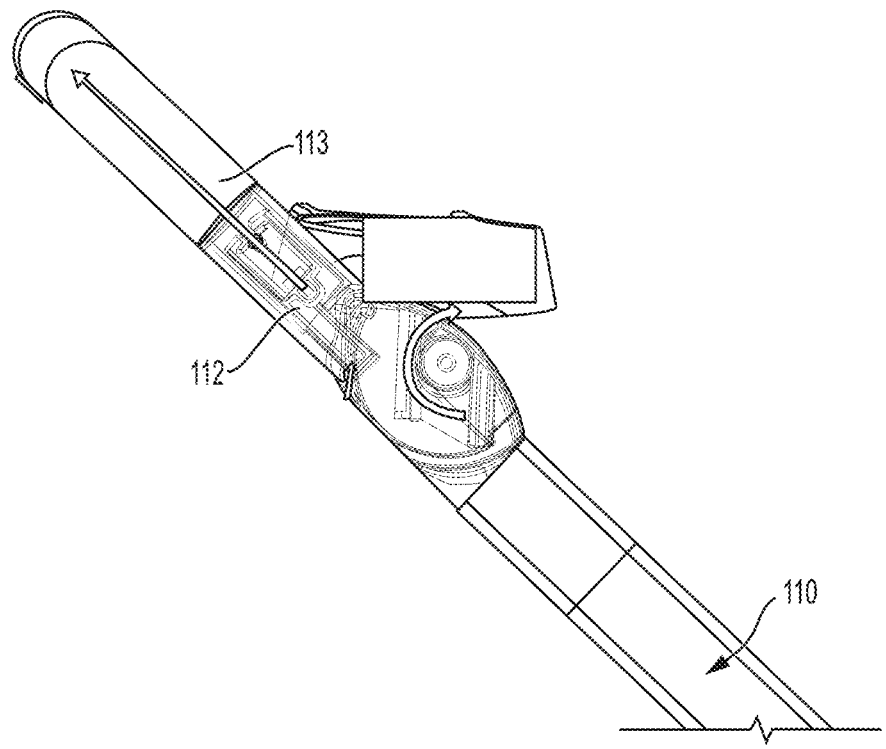
FIG. 13 is a schematic view showing a partial internal structure of the main stroller frame of the compact collapsible stroller of the present disclosure.

Referring to FIGS. 11 and 11A, a frame latch 150 pivotally connected to a handle plate 111 engages with a locking pin 1211 on a rear leg plate 121 such that the stroller 1 is locked in the opening position. When the frame latch 150 rotates so that the latch surface passes through the lock pin 1211 and disengages from the lock pin 1211, the handle plate 111 is allowed to rotate, and a front leg plate 131 is pulled by a link 160 to the folded position. Referring to FIG. 12, the handle portion 110, the rear leg portion 120, and the front leg portion 130 are folded almost parallel to one another to obtain a compact folded size for easy transportation or storage of the main stroller frame 10 when the stroller is not in use. Referring to FIG. 13, the upper half of the handle portion 110 is locked by a spring biased plunger 112 and thus cannot be rotated, the spring biased plunger 112 is pulled to an unlocked state by a cable anchored in a main folding release housing. In this way, the upper handle portion 113 and the parent bracket (the part extending horizontally from the upper handle portion 113 as shown in FIG. 10) rotates in the folding process to obtain a more compact folding size. Referring to FIG. 12, the stroller 1 has a folding boundary (as shown by the dotted block in FIG. 12) in the folding process. When the stroller 1 is transformed between the unfolded state and the folded state, none of the parts of the stroller 1 can exceed beyond the folding boundary.

Referring to FIG. 13, the upper handle portion 113 is pivotally fixed to the handle hub 114. The spring biased plunger 112 engages with the handle hub 114 so that the upper handle portion 113 cannot pivot relative to the handle hub 114. The spring biased plunger 112 is actuated via a cable to disengage from the handle hub 114 so that the upper handle portion 113 pivots relative to the handle hub 114.

Figure 14:
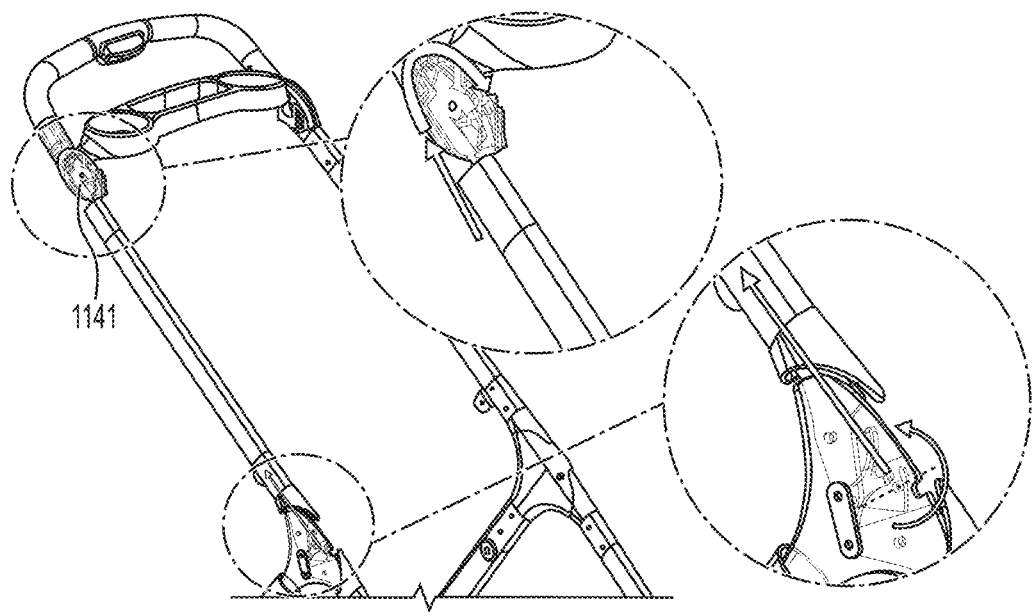
FIG. 14 is a partial schematic view showing the main stroller frame of the compact collapsible stroller of the present disclosure, in which a part of the area is enlarged to show its structure more clearly.
Figure 15:
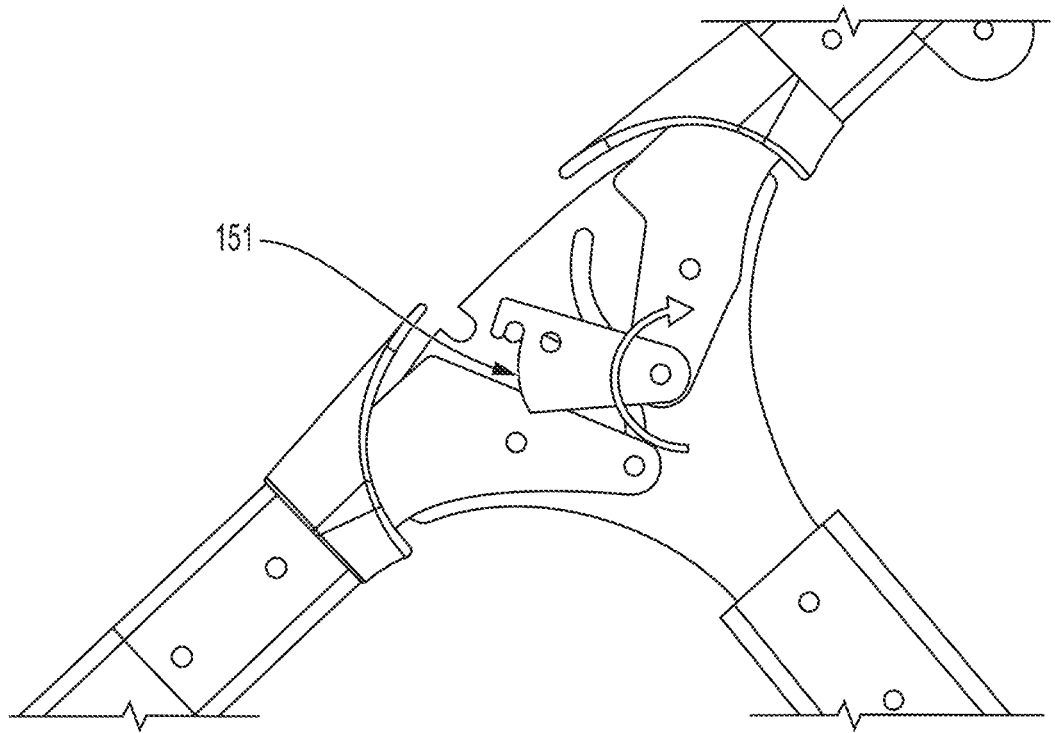
FIG. 15 is a partial view of the main stroller frame of the compact collapsible stroller of the present disclosure, in which one side of the internal structure is exposed.

Referring to FIG. 14, the cable anchored on a circular barrel 1141 in the handle hub 114 and coupled to the frame latch 150 rotates with the upper handle portion 113, to actuate the frame latch 150 (an arrow in FIG. 15 shows a direction in which the frame latch 150 is actuated) and pivot it past the locking pin, and thus fold the handle portion 110 toward the closed position. Time for folding is controlled by an extended latch surface 151 of the frame latch 150. The extended latch surface 151 allows the frame latch 150 to engage with the locking pin 1211 until the upper handle portion 113 has rotated by a larger distance from its original position. When the extended latch surface 151 disengages from the locking pin 1211, the handle portion 110 is folded toward the closed position. This results in a more natural folding movement while preventing the main stroller frame 10 from being accidentally folded (as shown in FIG. 15). When the upper handle portion 113 rotates toward the opening position, an anchor end of the cable rotates backward (counterclockwisely as shown in FIG. 13) along with the upper handle portion 113, and the length from the cable to the frame latch 150 increases, which allows the frame latch 150 to re-engage with the locking pin 1211.

Figure 16:
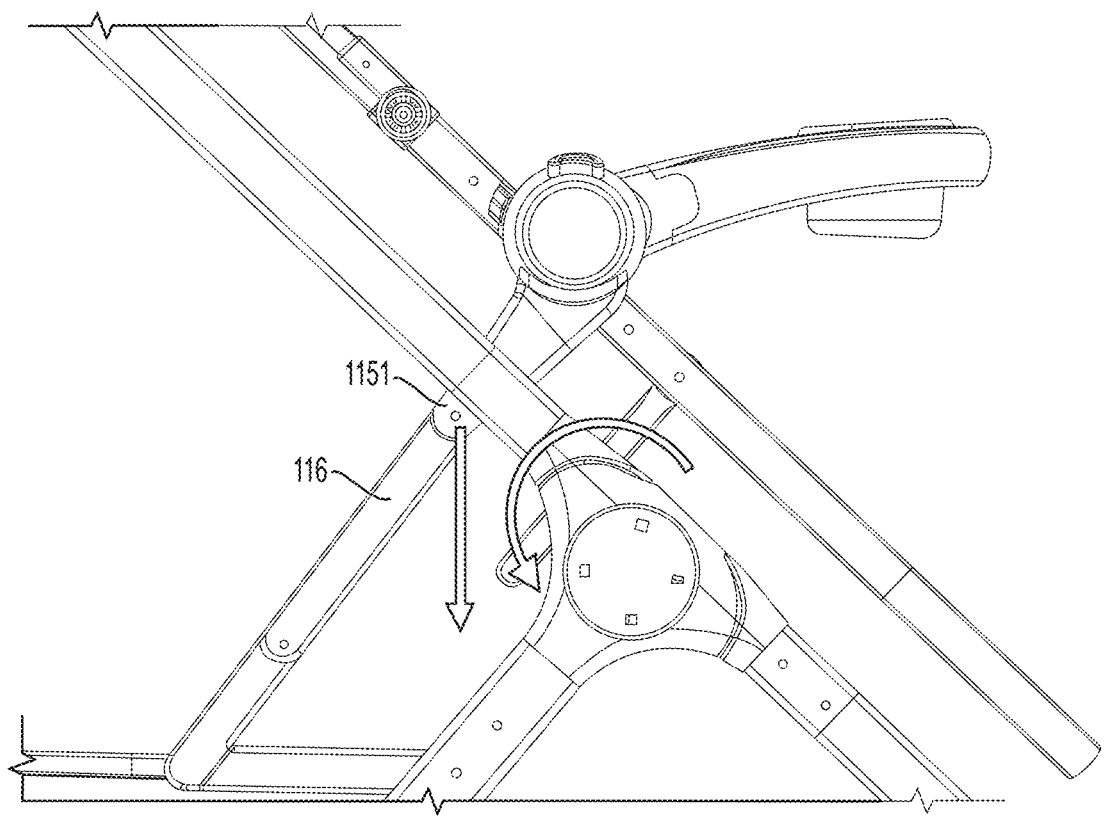
FIG. 16 is a partial side view of the compact collapsible stroller of the present disclosure.
Figure 16A:
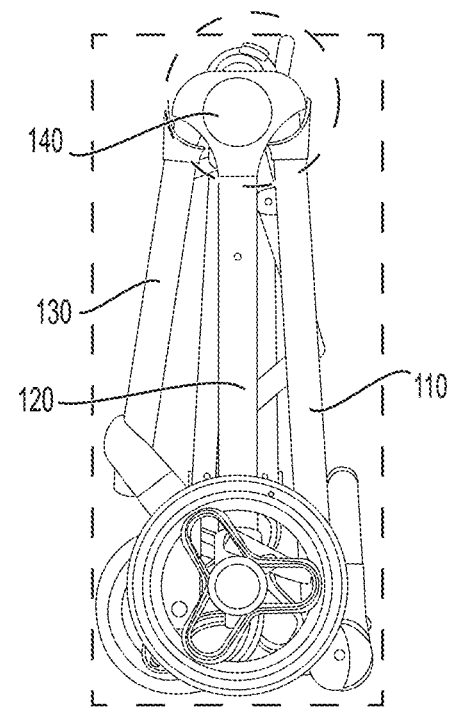
FIG. 16A is a side view of the compact collapsible stroller in a folded state of the present disclosure.
Figure 17:
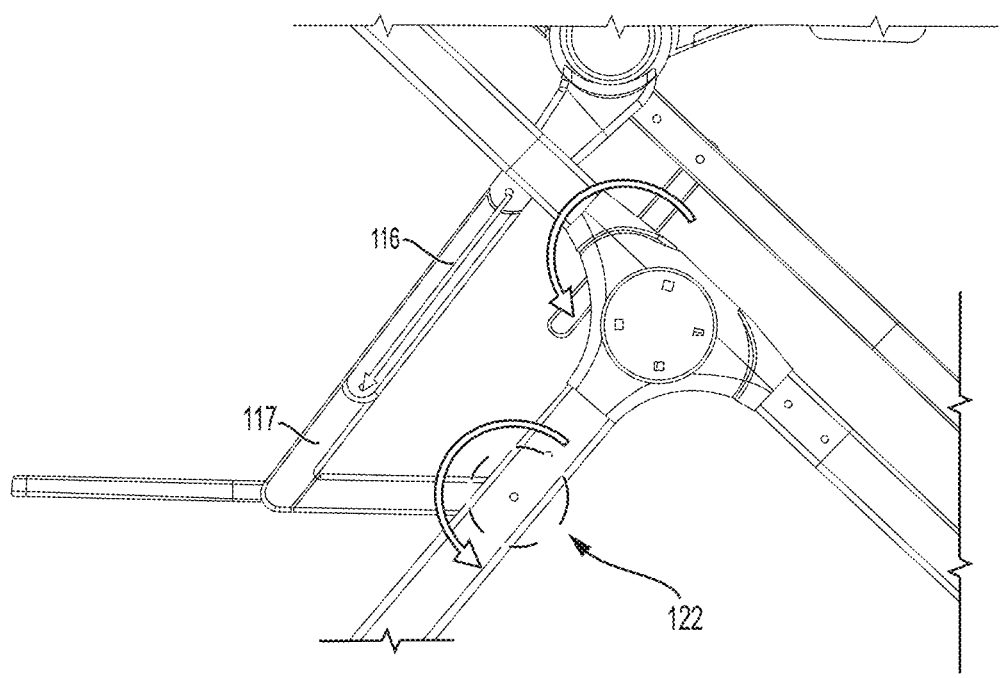
FIG. 17 is a partial side view of the compact collapsible stroller of the present disclosure.
Figure 17A:
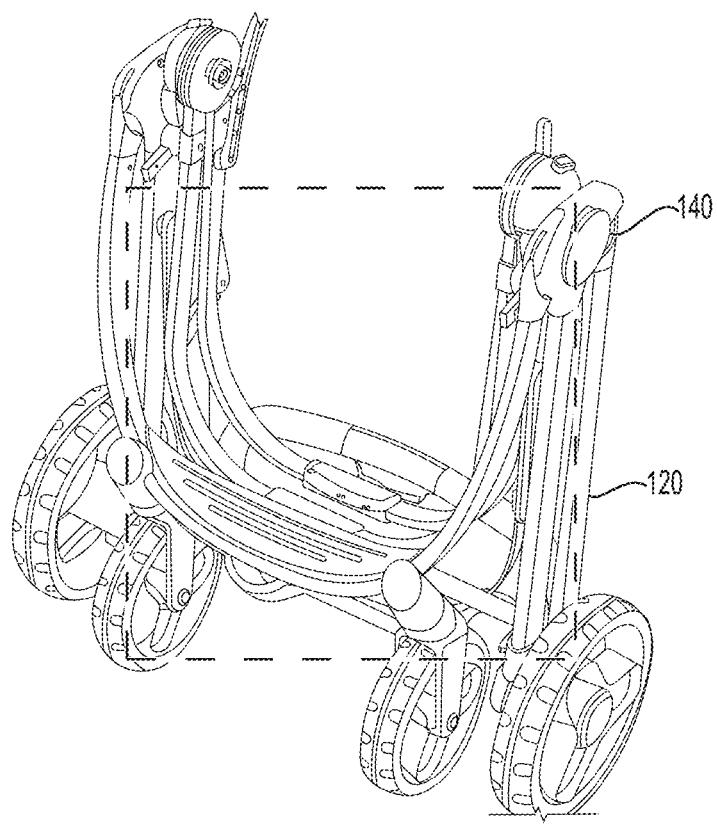
FIG. 17A is a perspective view of the compact collapsible stroller in a folded state of the present disclosure.
Figure 18:
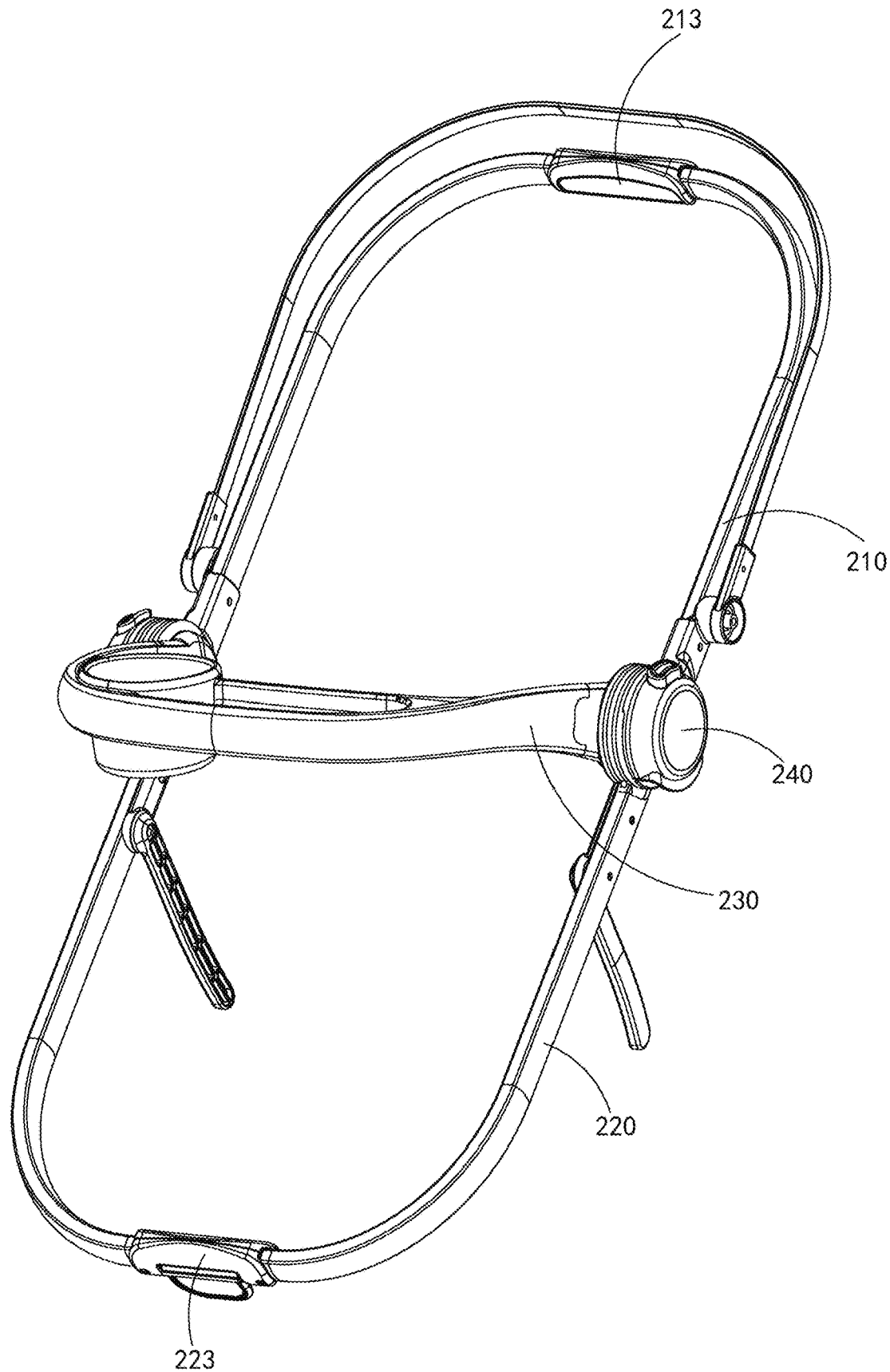
FIG. 18 is a perspective view of the child seat frame of the compact collapsible stroller of the present disclosure.
Figure 19:
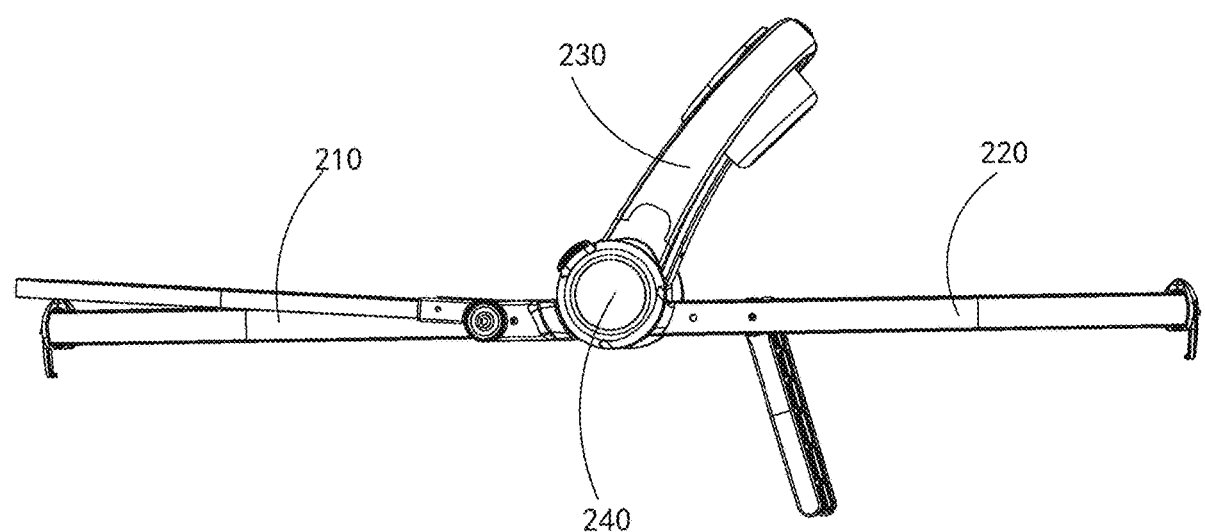
FIG. 19 is a side view of the child seat frame of the compact collapsible stroller of the present disclosure.
Figure 20:
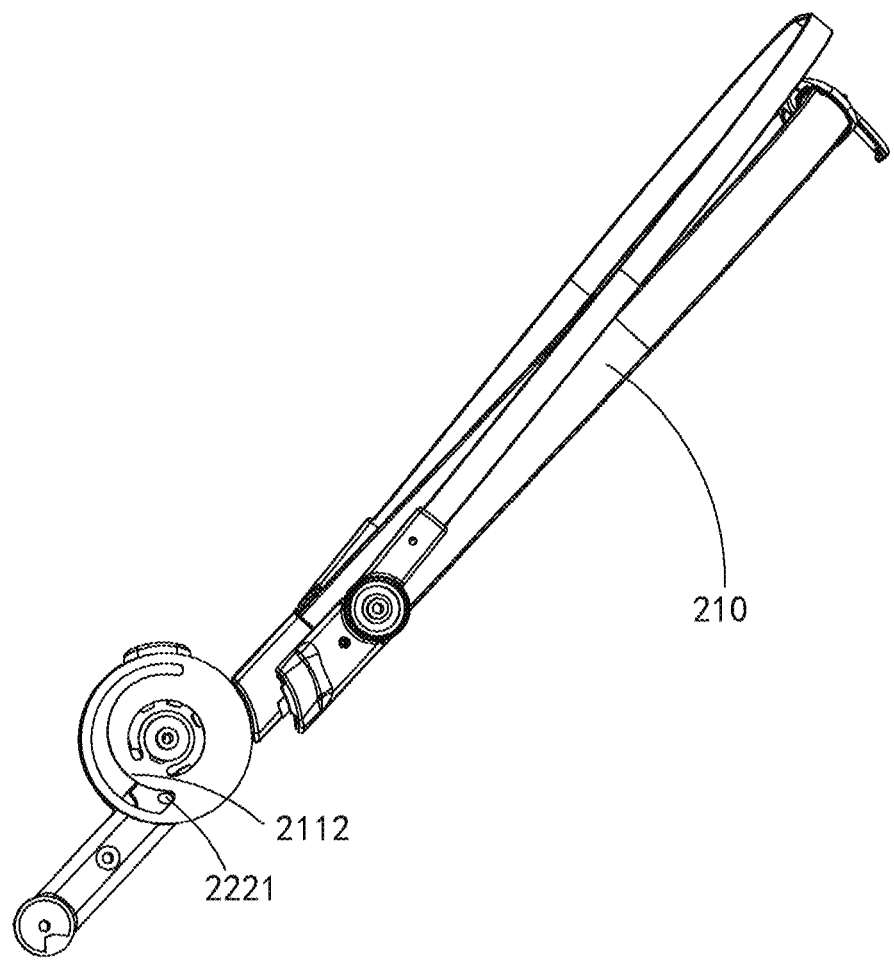
FIG. 20 is a side view of some parts of the child seat frame of the compact collapsible stroller of the present disclosure.
Figure 20:
Figure 21:
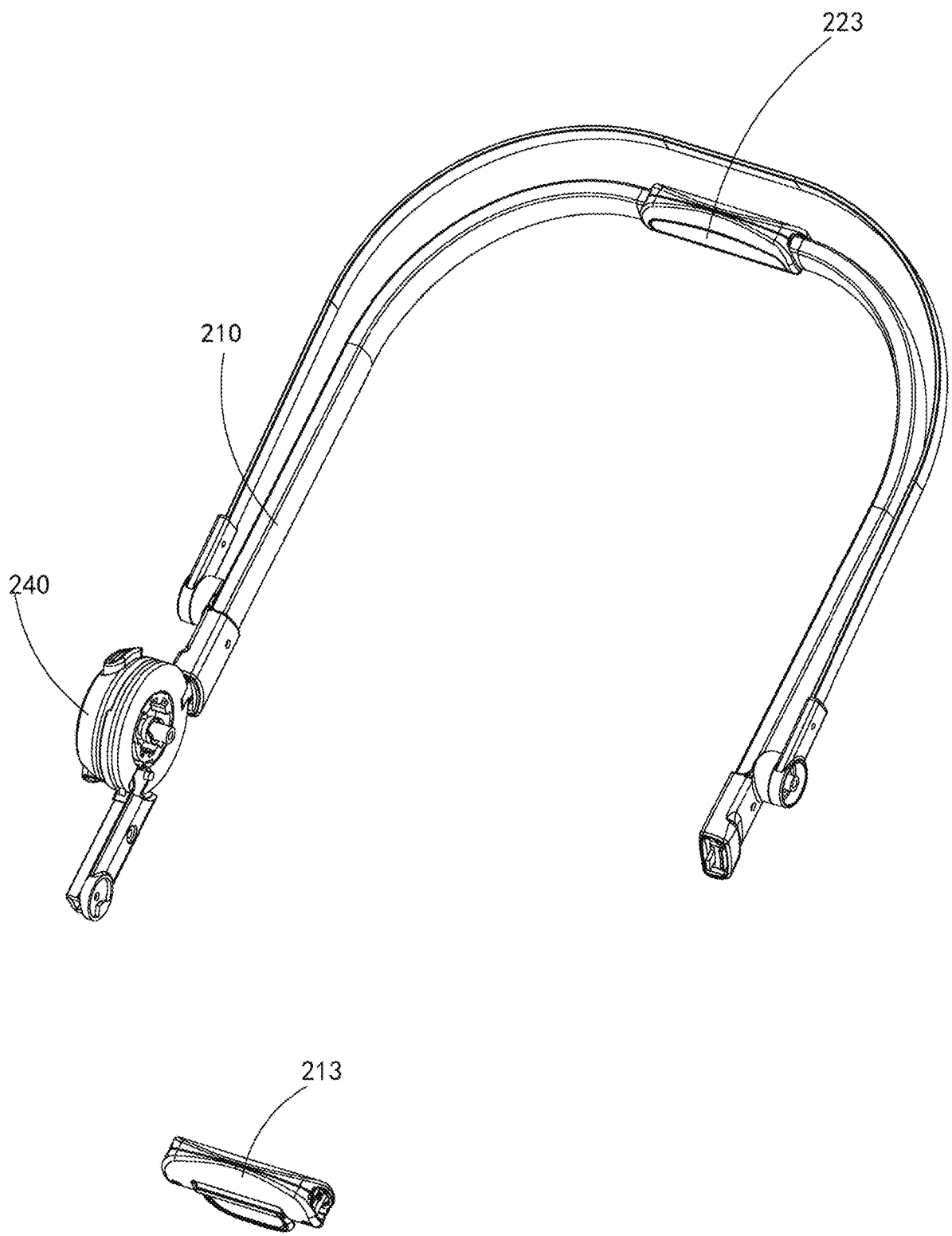
FIG. 21 is a perspective view of some parts of the child seat frame of the compact collapsible stroller of the present disclosure.
Figure 22:
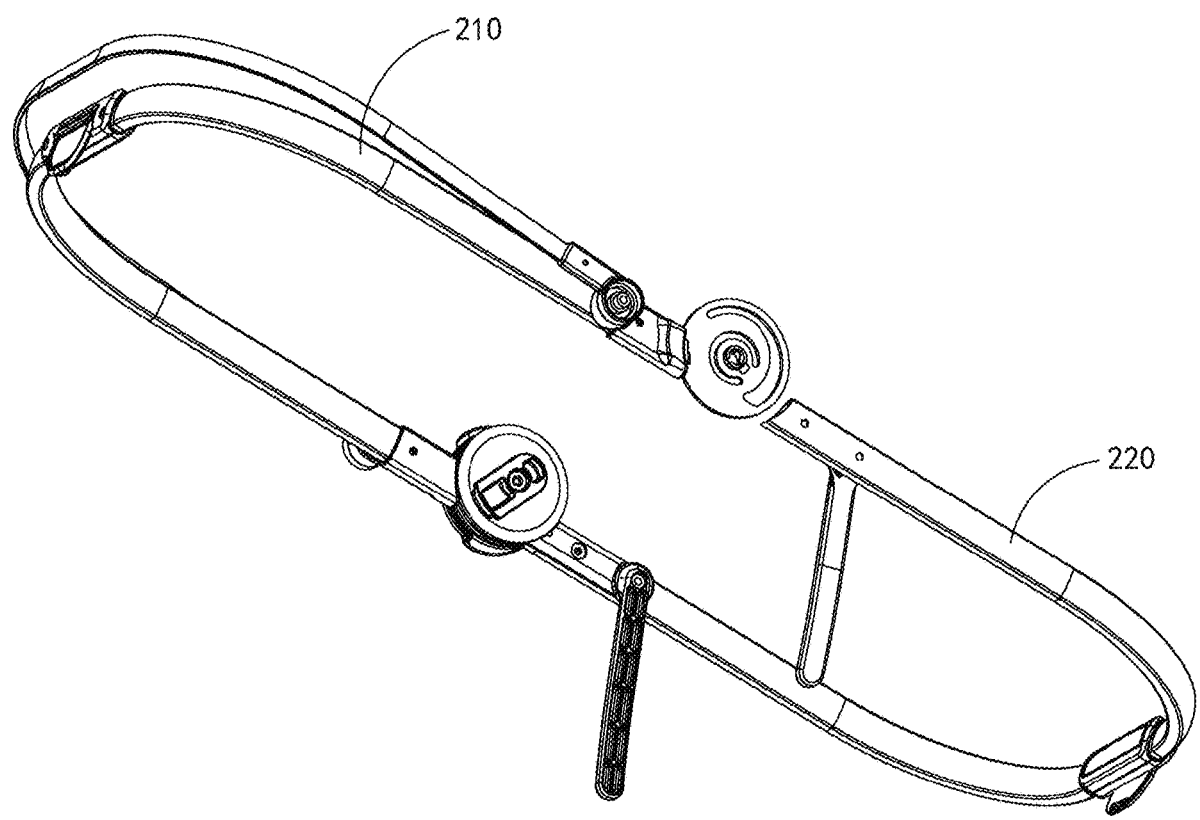
FIG. 22 is a perspective view of some parts of the child seat frame of the compact collapsible stroller of the present disclosure.
Figure 23:
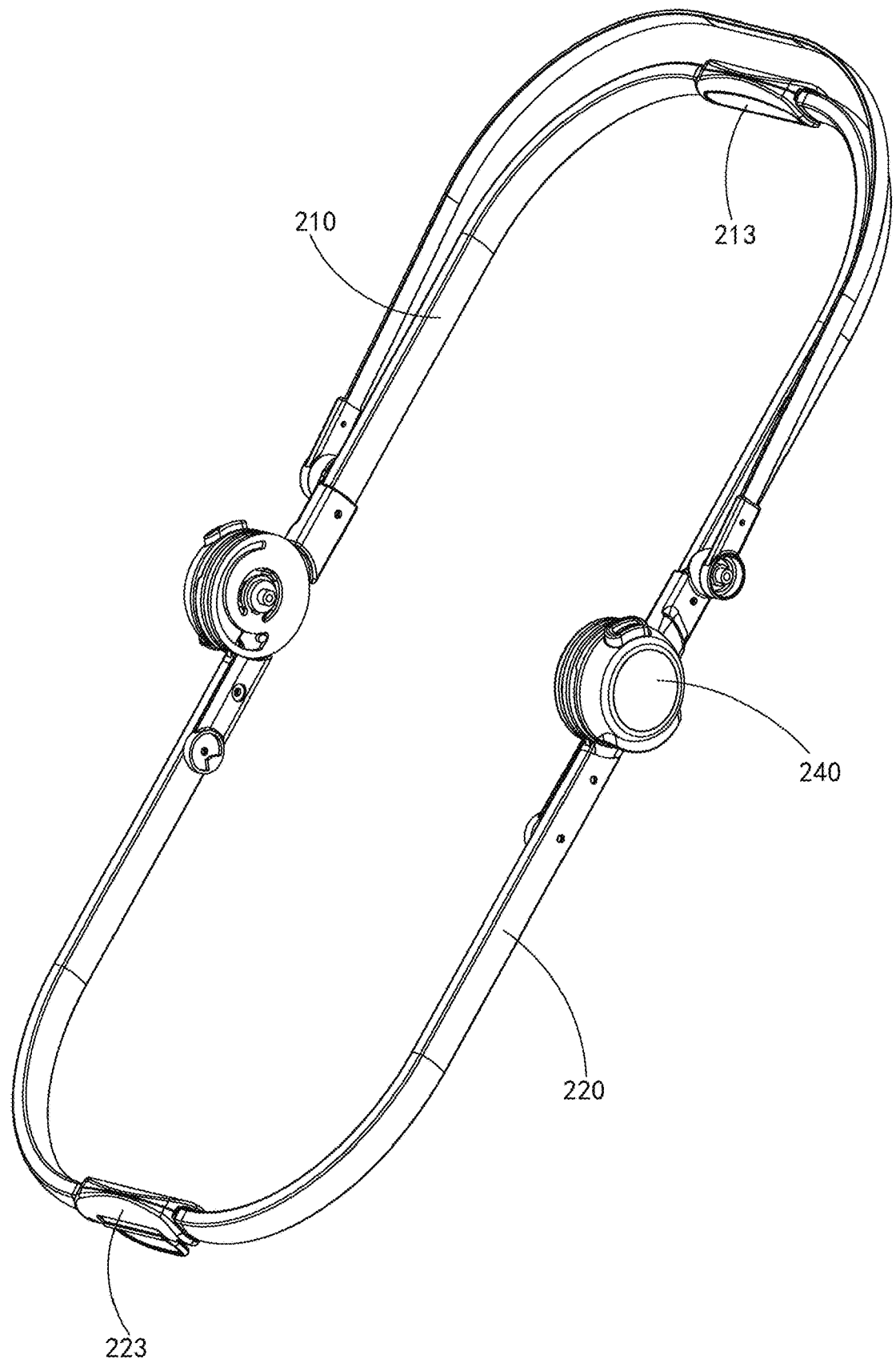
FIG. 23 is a perspective view of some parts of the child seat frame of the compact collapsible stroller of the present disclosure.
Figure 24:
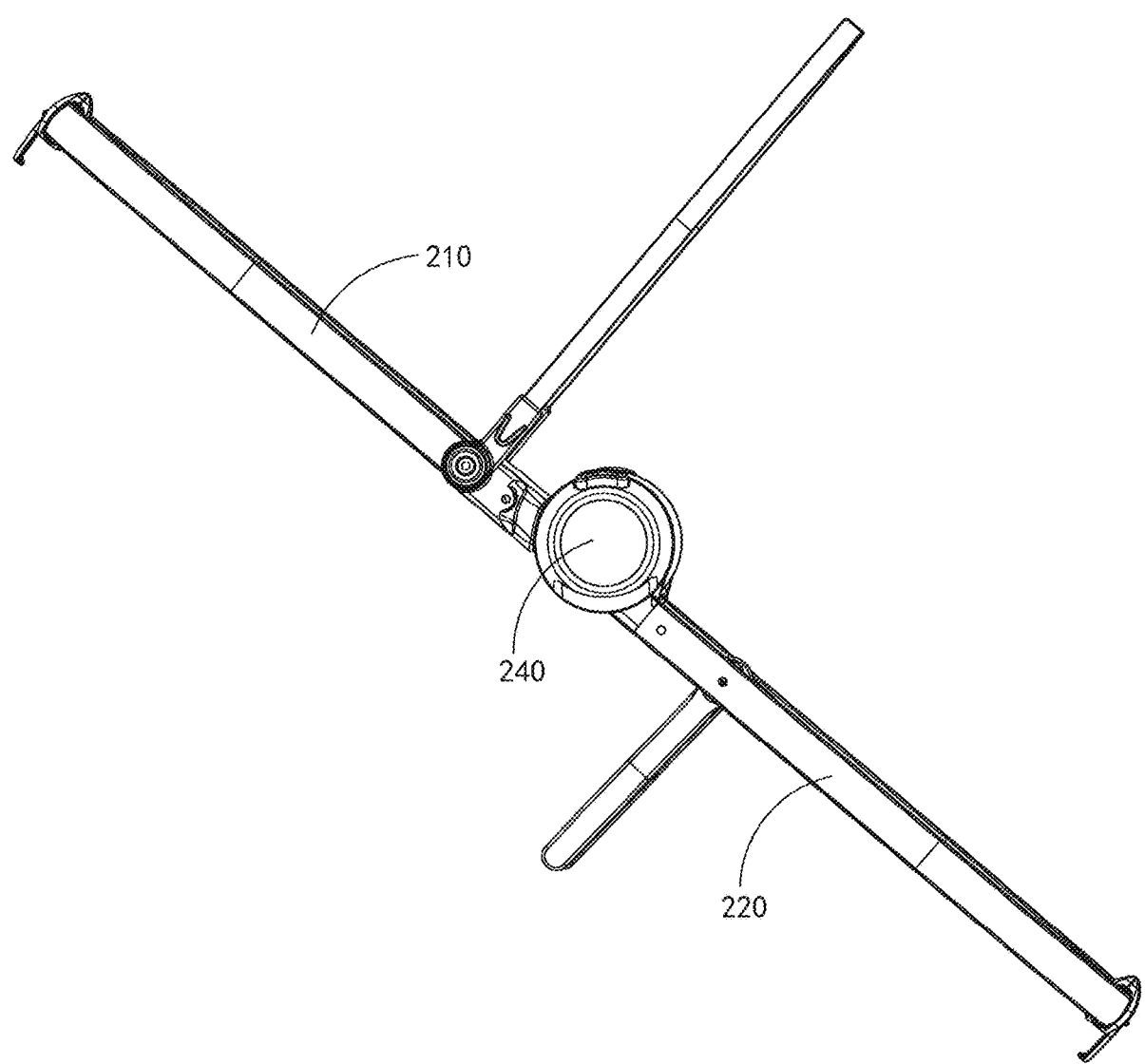
FIG. 24 is a side view of the child seat frame of the compact collapsible stroller of the present disclosure.

Referring to FIGS. 16 and 16A, the rotation of the lower handle portion 115 also drives a series of couplings between the seat mount 240 and the stroller basket for carrying the baby. An upper link 116 is directly coupled to the seat frame hub (seat mount) 240 and is connected to the handle portion 110 at a pivot point 1151. Due to the downward folding movement of the handle portion 110, the upper link 116 is driven downward and the child seat hub (seat mount) 240 is pulled within a predetermined folding boundary. Referring to FIGS. 17 and 17A, a basket frame is attached between a lower link 117 and a pivot point on the rear leg portion 120. Through the downward folding movement (pivoting movement) of the handle portion 110, the upper link 116 drives the lower link 117 in a downward movement, and further drives the basket frame downward and rotate it behind the rear leg portion 120. This allows the basket frame to be installed within the folding boundary while maximizing its size so as to achieve maximum storage capacity.

When the stroller 1 is transformed from the unfolded state (shown in FIGS. 16 and 17) to the folded state (shown in FIGS. 16A and 17A), the seat mount 240 gradually approaches the central frame hub 140, and finally overlaps or at least substantially overlaps in a transverse direction (perpendicular to the paper surface of FIG. 16A). At this time, the handle portion 110, the rear leg portion 120, and the front leg portion 130 vertically extend substantially downward from the central frame hub 140, and the upper frame 210, the lower frame 220, and the child tray 230 vertically extend substantially downward from the seat mount 240, so that the stroller 1 in the folded state occupies the minimum space.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

Although the present disclosure has been described with reference to the exemplary embodiments, the terms used are illustrative and exemplary rather than restrictive. Since the present disclosure is implemented in various forms without departing from the spirit and essence of the present disclosure, it should be understood that the foregoing embodiments are not limited to any of the foregoing details, but should be interpreted in the broadest sense within the scope defined by the claims. Therefore, all changes falling within the scope of the claims or their equivalents shall be covered by the claims.

The invention claimed is:

1. A child seat frame, comprising:
a seat mount configured to fix to a main stroller frame and having a first latch portion;
a lower frame having a lower seat frame hub and pivotally coupled to the seat mount, wherein the lower frame has a second latch portion and a lower frame locker, the lower frame locker actuated to engage with or disengage from the first latch portion, and when the lower frame locker disengages from the first latch portion, the lower frame pivots relative to the seat mount; and
an upper frame pivotally coupled to the seat mount and the lower frame, wherein the upper frame has an upper frame locker, the upper frame locker actuated to engage with and disengages from the second latch portion, and when the upper frame locker disengages from the lower seat frame hub, the upper frame pivots relative to the lower seat frame hub;
wherein the upper frame locker engages with the second latch portion when the lower frame pivots relative to the seat mount.

2. The frame according to claim 1, further comprising:
a child tray having a child tray hub and is pivotally coupled with the seat mount, the upper frame and the lower frame.

3. The frame according to claim 2, further comprising:
a latch pin assembly fixed in the seat mount and is engaged with or disengaged from the child tray hub, wherein the child tray does not pivot relative to the latch pin assembly when the latch pin assembly engages with the child tray hub, and the child tray pivots relative to the latch pin assembly when the latch pin assembly disengages from the child tray hub.

4. The frame according to claim 3, wherein the upper frame has an upper seat frame hub, one ramped surface is formed on a side of the latch pin assembly, and another ramped surface is formed on a side of the upper seat frame hub, and the one ramped surface interacts with the another ramped surface such that the latch pin assembly engages with or disengages from the child tray hub.

5. The frame according to claim 1, wherein the frame has a seat mode and a cradle mode, in the seat mode, the upper frame is tilted toward an upper side of the seat mount, the lower frame is tilted toward a lower side of the seat mount, and the upper frame and the lower frame are formed as a straight line; and in the cradle mode, the upper frame and the lower frame are formed as a horizontal straight line.

6. The frame according to claim 1, wherein a recline handle is provided on the lower frame, and the recline handle is linked with the lower frame locker, so that the lower frame locker disengages from the first latch portion by actuating the recline handle.

7. The frame according to claim 1, wherein a fold handle is provided on the upper frame, and the fold handle is linked with the upper frame locker, so that the upper frame locker disengages from the second latch portion by actuating the fold handle.

8. The frame according to claim 1, wherein the upper frame has an upper seat frame hub, a driving slot is formed on the upper seat frame hub, and a guide post is formed on the lower frame locker to permit the lower frame locker to be movably arranged in the driving slot.

9. The frame according to claim 8, wherein a spiral control surface is formed in the driving slot, and the spiral control surface gradually moves away from a center of the upper seat frame hub from one side to the other side.

10. The frame according to claim 9, wherein the spiral control surface causes that in a state where the lower frame engages with the seat mount, the lower frame disengages from the seat mount after the upper seat frame hub rotates by an angle.

11. The frame according to claim 8, wherein the guide post abuts against the spiral control surface, and when the upper seat frame hub rotates, the spiral control surface actuates the lower frame locker so that the lower frame engages with and disengages from the seat mount.

12. The frame according to claim 8, wherein the driving slot drives the guide post arranged in the driving slot to produce displacement by changing a slot width.

13. The frame according to claim 12, wherein when the upper seat frame moves away from the lower seat frame, the guide post is located at a position where the slot width of the driving slot is larger, and when the upper seat frame gradually approaches the lower seat frame, the slot width of the driving slot is gradually reduced to drive the guide post arranged in the driving slot to gradually move away from a center of the upper seat frame hub.

14. The frame according to claim 1, wherein the upper frame, the lower frame and the child tray pivot relative to the seat mount to be parallel to one another and in a vertical position.

15. The frame according to claim 1, wherein the lower frame locker is provided with an elastic member to tend to return the lower frame locker back to the first latch portion and the upper frame locker is provided with another elastic member to tend to return the upper frame locker back to the second latch portion.

16. A compact collapsible stroller, comprising:
a main stroller frame; and
a child seat frame coupled to the main stroller frame as claimed in claim 1.

* * * * *